(12) United States Patent
Knas et al.

(10) Patent No.: US 10,963,823 B1
(45) Date of Patent: Mar. 30, 2021

(54) SYSTEMS AND METHODS FOR CHATBOT APPLICATIONS PERFORMING TASKS BASED ON USER STRESS LEVELS

(71) Applicant: MASSACHUSETTS MUTUAL LIFE INSURANCE COMPANY, Springfield, MA (US)

(72) Inventors: Michal Knas, Monson, MA (US); Payton A. Shubrick, Springfield, MA (US); Damon Ryan Depaolo, Barkhamsted, CT (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 156 days.

(21) Appl. No.: 15/975,660

(22) Filed: May 9, 2018

Related U.S. Application Data

(60) Provisional application No. 62/530,922, filed on Jul. 11, 2017, provisional application No. 62/531,002, filed on Jul. 11, 2017, provisional application No. 62/531,052, filed on Jul. 11, 2017, provisional application No. 62/504,401, filed on May 10, 2017.

(51) Int. Cl.
*G06Q 10/00* (2012.01)
*G06Q 10/06* (2012.01)
*G06Q 10/10* (2012.01)

(52) U.S. Cl.
CPC ......... *G06Q 10/063* (2013.01); *G06Q 10/107* (2013.01); *G06Q 10/109* (2013.01)

(58) Field of Classification Search
CPC ... G06Q 10/063; G06Q 10/107; G06Q 10/109
See application file for complete search history.

(56) References Cited

U.S. PATENT DOCUMENTS

| | | | |
|---|---|---|---|
| 7,100,116 B1 | 8/2006 | Shafrir et al. | |
| 8,219,621 B2 | 7/2012 | Laakkonen | |
| 8,219,624 B2 * | 7/2012 | Haynes | G06Q 10/109 709/206 |
| 10,338,775 B2 | 7/2019 | Cunney et al. | |

(Continued)

OTHER PUBLICATIONS

Goodman, Bradley A., et al. "Applying user models to improve team decision making." Retrieved (Apr. 10, 2006): 2008. (Year: 2006).*

(Continued)

*Primary Examiner* — Matthew S Gart
*Assistant Examiner* — Hamzeh Obaid
(74) *Attorney, Agent, or Firm* — Foley & Lardner LLP

(57) ABSTRACT

A system comprising: a server configured to: generate an interface based on a first user profile stored in a database; present the interface on a first client associated with the first user profile, wherein the interface depicts a set of input elements; receive a set of inputs from the set of input elements; generate a macro based on the set of inputs; associate the macro with a range of values based on the set of inputs; host a chatbot application; generate a value based on the chatbot application accessing a PIM application on a second client associated with a second user profile stored in the database; and enable the macro to be performed based on the value being within the range of values.

20 Claims, 5 Drawing Sheets

(56) References Cited

U.S. PATENT DOCUMENTS

| | | | |
|---|---|---|---|
| 2002/0019784 A1* | 2/2002 | Ritz | G06Q 30/08 705/26.62 |
| 2004/0003042 A1 | 1/2004 | Horvitz et al. | |
| 2004/0143636 A1* | 7/2004 | Horvitz | H04L 29/06 709/207 |
| 2008/0134069 A1* | 6/2008 | Horvitz | G06Q 10/10 715/765 |
| 2011/0021145 A1* | 1/2011 | Johnson | H04W 4/14 455/41.2 |
| 2013/0318079 A1* | 11/2013 | Kindel | G06F 16/358 707/728 |
| 2014/0049790 A1 | 2/2014 | Nakamura | |
| 2014/0214973 A1* | 7/2014 | DeLuca | H04L 51/26 709/206 |
| 2014/0325531 A1* | 10/2014 | Harm | G06F 9/445 719/320 |
| 2015/0095086 A1 | 4/2015 | Gopinath et al. | |
| 2015/0140527 A1 | 5/2015 | Gilad-Barach et al. | |
| 2016/0234143 A1 | 8/2016 | Choudhary et al. | |
| 2017/0250930 A1* | 8/2017 | Ben-Itzhak | G06F 3/011 |
| 2018/0026920 A1* | 1/2018 | Chen | H04L 51/26 455/466 |
| 2018/0060826 A1* | 3/2018 | Stratvert | G06Q 10/109 |
| 2018/0096686 A1 | 4/2018 | Borsutsky et al. | |
| 2018/0157979 A1* | 6/2018 | Dehaghani | G06Q 10/1093 |

OTHER PUBLICATIONS

Leshed, Gilly, and Phoebe Sengers."'I lie to myself that i have freedom in my own schedule" productivity tools and experiences of busyness." Proceedings of the SIGCHI Conference on Human Factors in Computing Systems. 2011. (Year: 2011) (Year: 2011).*

* cited by examiner

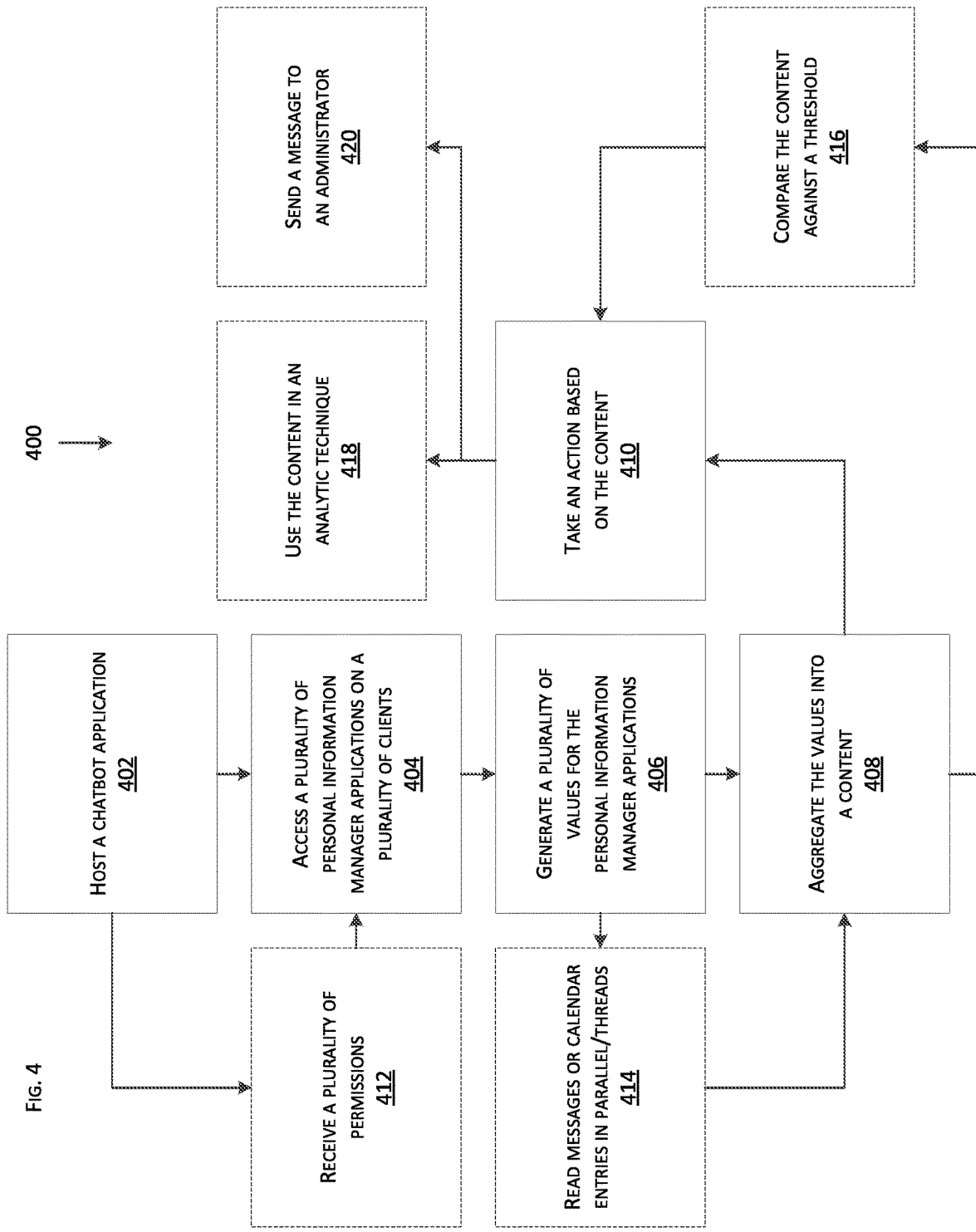

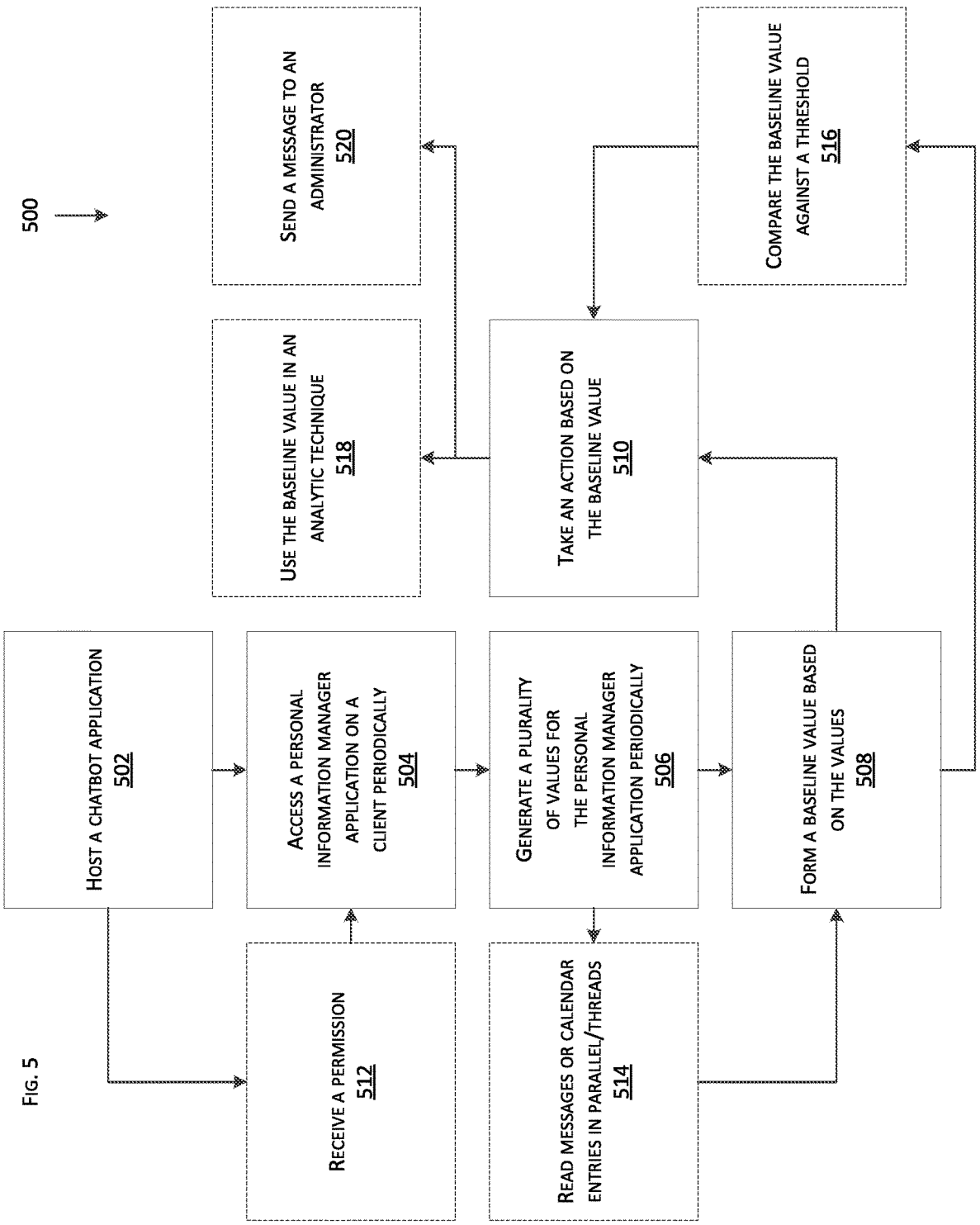

SYSTEMS AND METHODS FOR CHATBOT APPLICATIONS PERFORMING TASKS BASED ON USER STRESS LEVELS

CROSS-REFERENCE TO RELATED APPLICATIONS

This application claims a benefit of U.S. Provisional Patent Application 62/504,401, filed on May 10, 2017, which is herein incorporated by reference for all purposes.

This application claims a benefit of U.S. Provisional Patent Application 62/530,922, filed on Jul. 11, 2017, which is herein incorporated by reference for all purposes.

This application claims a benefit of U.S. Provisional Patent Application 62/531,002, filed on Jul. 11, 2017, which is herein incorporated by reference for all purposes.

This application claims a benefit of U.S. Provisional Patent Application 62/531,052, filed on Jul. 11, 2017, which is herein incorporated by reference for all purposes.

TECHNICAL FIELD

Generally, this disclosure relates to chatbot applications. More particularly, this disclosure relates to chatbot applications performing tasks based on user stress levels.

BACKGROUND

In this disclosure, where a document, an act, and/or an item of knowledge is referred to and/or discussed, then such reference and/or discussion is not an admission that the document, the act, and/or the item of knowledge and/or any combination thereof was at a priority date, publicly available, known to a public, part of common general knowledge, and/or otherwise constitutes any prior art under any applicable statutory provisions; and/or is known to be relevant to any attempt to solve any problem with which this disclosure is concerned with. Further, nothing is disclaimed.

Many users of personal information manager (PIM) applications, such as Microsoft Outlook, whether provided as a stand-alone desktop/laptop application, a Software-as-a-Service (SaaS) technique, or a mobile app, are overwhelmed by a flood of information, as manifested through a multitude of emails, chats, missed call notices, calendar entries, task entries, or reminders in the PIM applications. For example, the users can become stressed when the emails or the chats are marked as urgent, especially if received within a single day, and even more so, if received less than within twelve hours of each other. Similarly, the users can become stressed when the calendar entries and the task entries overlap, as being due simultaneously or consecutively with no time breaks in-between.

The PIM applications are generally unable to provide suitable graphical user interfaces or macros to effectively deal with the flood of information. Although some of the PIM applications employ boomeranging to address the flood of information, this approach is ineffective since such boomeranging merely delays some aspects of the flood of information for short periods of time, such as days or weeks. As such, this state of being not only negatively affects the users, whether mentally or from workflow perspective, but also makes the PIM applications slow or crash-prone, especially if the PIM applications depend on various networked-services, such as Microsoft Exchange or Microsoft SharePoint.

SUMMARY

This disclosure at least partially addresses at least one of above inefficiencies. However, this disclosure can prove useful to other technical areas. Therefore, various claims recited below should not be construed as necessarily limited to addressing any of the above inefficiencies.

In an embodiment, there is provided a method comprising: accessing, by a server, a database storing a first user profile and a second user profile, wherein the first user profile has a first level of access with respect to the server, wherein the second user profile has a second level of access with respect to the server, wherein the first level of access is higher than the second level of access; generating, by the server, a user interface based on the first user profile; presenting, by the server, the user interface on a first client, wherein the user interface includes a set of input elements, wherein the first client is associated with the first user profile; receiving, by the server, a set of inputs from the first client, wherein the set of inputs is sourced from the set of input elements; generating, by the server, a macro based on the set of inputs; storing, by the server, the macro in the second user profile such that the macro is associated with a range of values based on the set of inputs, wherein the second user profile includes the range of values; running, by the server, a chatbot application; causing, by the server, the chatbot application to read a calendar entry of a personal information manager (PIM) application and a received message of the PIM application, wherein the PIM application is based on the second user profile, wherein the PIM application is associated with a second client, wherein the second client is associated with the second user profile; generating, by the server, a busyness factor based on the chatbot application having read the calendar entry and the received message; comparing, by the server, the busyness factor against the range of values; and causing, by the server, the macro to be performed based on the busyness factor being within the range of values.

In an embodiment, there is provided a system comprising: a server configured to: access a database storing a first user profile and a second user profile, wherein the first user profile has a first level of access with respect to the server, wherein the second user profile has a second level of access with respect to the server, wherein the first level of access is higher than the second level of access; generate a user interface based on the first user profile; present the user interface on a first client, wherein the user interface includes a set of input elements, wherein the first client is associated with the first user profile; receive a set of inputs from the first client, wherein the set of inputs is sourced from the set of input elements; generate a macro based on the set of inputs; store the macro in the second user profile such that the macro is associated with a range of values based on the set of inputs, wherein the second user profile includes the range of values; run a chatbot application; cause the chatbot application to read a calendar entry of a personal information manager (PIM) application and a received message of the PIM application, wherein the PIM application is based on the second user profile, wherein the PIM application is associated with a second client, wherein the second client is associated with the second user profile; generate a busyness factor based on the chatbot application having read the calendar entry and the received message; compare the busyness factor against the range of values; and cause the macro to be performed based on the busyness factor being within the range of values.

This disclosure is embodied in various forms illustrated in a set of accompanying illustrative drawings. Note that variations are contemplated as being a part of this disclosure, limited only by a scope of various claims recited below.

BRIEF DESCRIPTION OF DRAWINGS

The set of accompanying illustrative drawings shows various embodiments of this disclosure. Such drawings are not to be construed as necessarily limiting this disclosure. Like numbers and/or similar numbering scheme can refer to like and/or similar elements throughout.

FIG. 4 shows a flowchart of an embodiment of a method for a chatbot application to track a plurality of stress levels on a plurality of clients according to this disclosure.

FIG. 5 shows a flowchart of an embodiment of a method for a chatbot application to monitor a user stress value on a client according to this disclosure.

DETAILED DESCRIPTION

Figure 1:
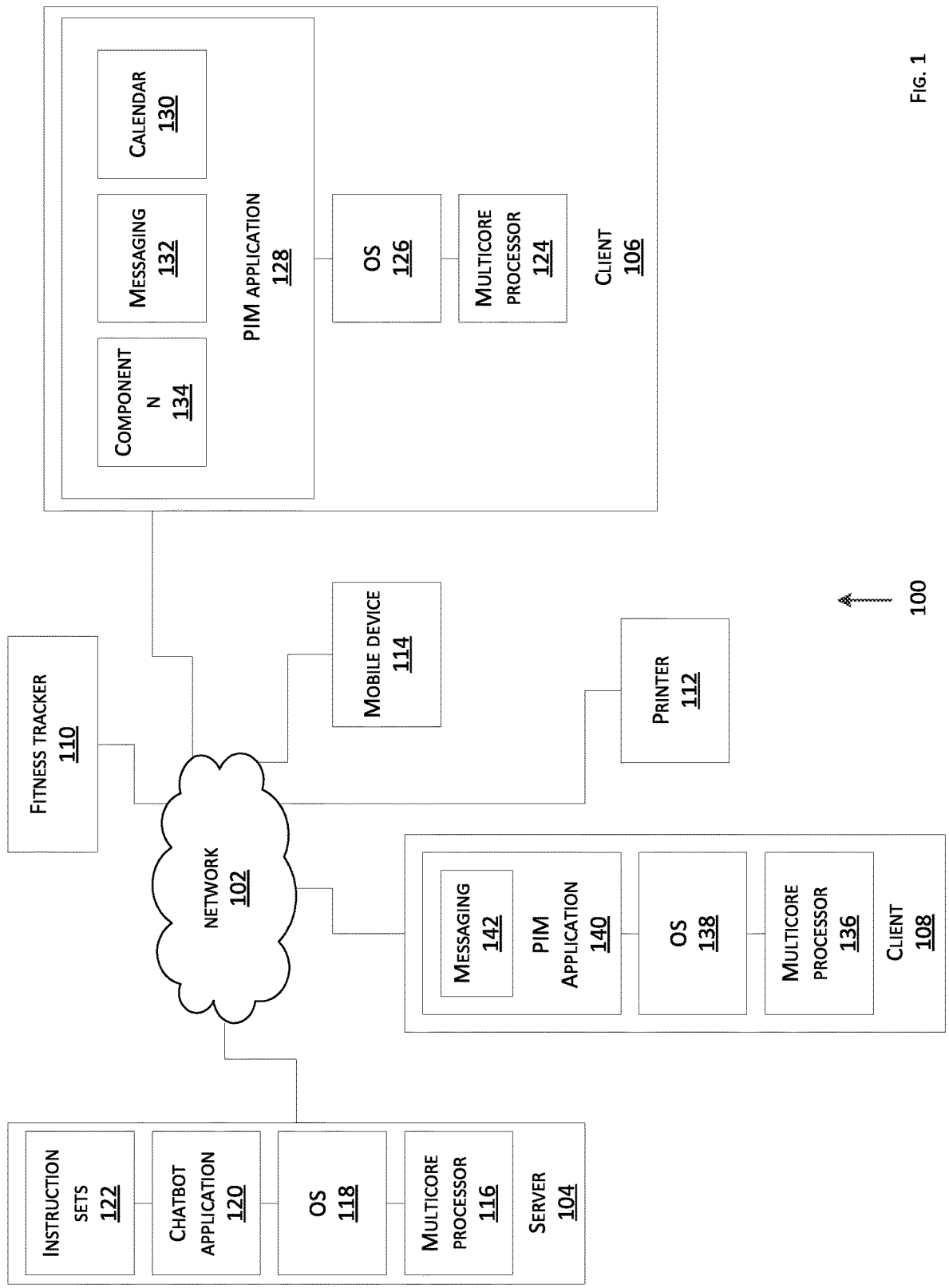
FIG. 1 shows a schematic diagram of an embodiment of a network topology according to this disclosure.

This disclosure is now described more fully with reference to the set of accompanying drawings, in which some embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys various concepts of this disclosure to skilled artisans.

Generally, this disclosure enables a chatbot application to interface with a PIM application and then take an action based on such interfacing. In particular, the chatbot application can determine a user stress level based on the chatbot application reading the PIM application. For example, the reading can include reading an email message, a chat message, a calendar entry, or a task entry, including any format, content, characteristic, or aspect thereof. For example, the user stress level can include a value generated based on the chatbot application determining a busyness or a user stress level factor based on reading various email messages, calendar entries, and task entries in the PIM application. The action can include messaging other PIM applications, peripheral devices, fitness trackers, or mobile devices such that the messaging requests or enables an action, whether via the PIM application, the other PIM applications, the peripheral devices, the fitness trackers, or the mobile devices. For example, the chatbot application may message another user informing that user that the user of the PIM application is going to be or is currently very busy. When the chatbot application interfaces with the fitness tracker, such as through the PIM application, then such interfacing enables the chatbot application to better ascertain the user stress level, such as via a heartbeat of the user, a heart rate of the user, a blood pressure of the user, or other health related metrics, and potentially modify the user stress level determined via the chatbot application interfacing with the PIM application. Resultantly, the chatbot application can determine a busyness factor or a user stress level, and by looking at the PIM application, the chatbot application can find out how busy or stressed a user is and then create a strategy to manage the stress. This disclosure also enables users with higher or more access privileges (supervisors) to create macros for users with lower or less access privileges (supervisees) and have the macros performed for the users with lower or less access privileges when the macros are triggers based on specified user busyness factors or user stress levels. This disclosure further enables the chatbot application to determine various busyness factors or user stress levels for a plurality of users and then aggregate such values into a content for various uses, such as specific user(s) busyness/stress level query responses or analytics. This disclosure additionally enables busyness factor or stress level baseline value generation based on periodic querying of a user PIM application and then acting based on such value satisfying a threshold value.

FIG. 1 shows a schematic diagram of an embodiment of a network topology according to this disclosure. A network topology 100 comprises a network 102, a server 104, a client 106, a client 108, a fitness tracker 110, a printer 112, and a mobile device 114.

The network 102 includes a plurality of nodes that allow for sharing of resources or information. The network 102 can be wired, waveguide, wireless, or others. For example, the network 102 can be a local area network (LAN), a wide area network (WAN), a cellular network, a satellite network, a personal area network (PAN), a fiber optic network, or others.

The server 104 includes a multicore processor 116, a memory in communication with the processor 116, and a transceiver in communication with the processor 116. The memory stores an operating system (OS) 118, a chatbot application 120, and a plurality of instruction sets 122. The transceiver, such as a transmitter and a receiver, signally communicates with the network 102, whether in a wired, waveguide, or wireless manner. The OS 118, such as MacOS or Windows, runs on the processor 116. The chatbot application 120 runs on the OS 118. The instruction sets are hosted in the chatbot application 120, the OS 118, or in another form of logic internal the server 104, whether in a hardware form, such as a circuit, a chip, a storage medium, or others, or a software form, such as a module, firmware, object, or others. In some embodiments, the instruction sets 122 are hosted external to the server 104, such as remotely, yet such that the chatbot application 120 has access thereto, such as read, write, delete, or others. For example, the instruction sets 122 can be hosted via the client 106. In some embodiments, the client 106 hosts the chatbot application 120.

The server 104 can include and/or be coupled to, whether directly and/or indirectly, an input device, such as a mouse, a keyboard, a camera, whether forward-facing and/or back-facing, an accelerometer, a touchscreen, a biometric reader, a clicker, a microphone, or any other suitable input device. The server 104 can include and/or be coupled to, whether directly and/or indirectly, an output device, such as a display, a speaker, a headphone, a printer, or any other suitable output device. In some embodiments, the input device and the output device can be embodied in one unit, such as a touch-enabled display, which can be haptic.

The processor 116 comprises a plurality of independent cores. For example, the processor 116 is a computing component with two or more independent processing units, which are the units that read and execute program instructions, such as the chatbot application 120, such as via multiprocessing or multithreading. The instructions are processing instructions, such as add, move data, or branch, but the cores can run multiple instructions concurrently, thereby increasing an overall operational speed for the chatbot application 120, which is amenable to parallel computing. The cores can process in parallel when concurrently accessing a file or any other data structure, as disclosed herein, while being compliant with atomicity, consistency, isolation, and durability (ACID) principles, which ensure that such data structure operations/transactions, such as read, write, erase, or others, are processed reliably. For example, a data structure can be accessed, such as read or written, via at least two cores concurrently without locking the data structure between such cores. Note that there can be at least two cores, such as two cores, three cores, four cores, six cores, eight cores, ten cores, twelve cores, or more. The cores may or may not share caches, and the cores may or may not implement message passing or shared-memory inter-core communication methods. Common network topologies to interconnect cores include bus, ring, two-dimensional mesh, and crossbar. Homogeneous multi-core systems include only identical cores, heterogeneous multi-core systems can have cores that are not identical. The cores in multi-core systems may implement architectures, such as very long instruction word (VLIW), superscalar, vector, or multithreading.

The application 120 includes a chatbot logic programmed to simulate human conversation via auditory, such via sound, or textual, such as via chat, methods through artificial intelligence (AI). The application 120 can employ a natural language processing (NLP) technique or scan for flags or keywords within an input and then respond, such as via pulling a reply, with a matching keyword or a similar wording pattern from a database, which may be stored locally or remotely. For example, the server 104 or the client 106 can host the database, which may be of any type, such as graphical, in-memory, relational, post-relational, or others. Alternatively, the database is hosted remotely and given remote access, such as read or write access. For example, the NLP technique can include lemmatization, morphological segmentation, stemming, lexical semantics, machine translation, sentiment analysis, relationship extraction, topic segmentation, word sense disambiguation, summarization, conference resolution, discourse analysis, or others. In some embodiments, the client 106 hosts the chatbot application 120.

The instruction sets 120 include a plurality of sets of instructions to perform a plurality of tasks, as disclosed herein. Any type of correspondence between the sets of instructions and the tasks is possible, such as one-to-one, one-to-many, many-to-one, and many-to-many. Also, the sets of instructions can be mixed and matched in any combinatory manner. For example, the instruction sets 120 can include a set of instructions with a Boolean logic. The instruction sets 120 can include a set of instructions containing a rule or pattern that specifies how an input, such as a sequence of alphanumeric characters, should be mapped to an output, such as a sequence of alphanumeric characters, according to a defined procedure. The instruction sets 120 can include a set of instructions that is initiative of execution, executable, or instructive of execution, whether via the server 104, the client 106, the client 108, the tracker 110, the printer 112, or the device 114. The instruction sets 120 can include a set of instructions that is created/edited on the server 104, such as via a user of the server 104, whether local or remote, or a logic of the server 104. Alternatively, the set of instructions can be downloaded onto the server 104 over the network 102, such as via a user of the server 104 or a logic of the server 104, whether local or remote. For example, the instruction sets 120 can include a set of instructions instructive of the server 104 to cause the client 106 to send a message to the client 108, the printer 112, or the device 114. In some embodiments, the chatbot application 120 includes the instruction sets 122. In some embodiments, the instruction sets 120 can be hosted on the client 106.

The client 106 includes a multicore processor 124, a memory in communication with the processor 124, and a transceiver in communication with the processor 124. The memory stores an OS 126 and a PIM application 128. The transceiver, such as a transmitter and a receiver, signally communicates with the network 102, whether in a wired, waveguide, or wireless manner. The OS 126, such as MacOS or Windows, runs on the processor 124. The PIM application 128 runs on the OS 126. For example, the PIM application 128 can include Microsoft Outlook, whether provided as a stand-alone desktop/laptop application, a SaaS technique, or a mobile app.

The PIM application 128 includes a calendar component 130, a messaging component 132, and a component N 134. The chatbot application 120 can read the PIM application 128, such as the component 130, the component 132, or the component 134. For example, such reading can include reading messages, entries, files, settings, or others in or associated with the PIM application 128, inclusive of or associated with the component 130, the component 132, and the component 134. In some embodiments, the PIM application 128 includes the chatbot application 120 or the instruction sets 122, whether natively or as a plug-in or extension. In some embodiments, the client 106 hosts the chatbot application 128 or the instruction sets 122 external to the PIM application 128, such as a part of the OS 126 or other logic, whether hardware or software on the client 106. For example, the chatbot application 120 can run on the OS 126.

The component 130 includes a calendar functionality with a plurality of daily, daylong, or weekly entries, whether one-time or recurring. For example, the component 130 can include meeting or event entries, reminders, or others. Each of the entries includes a content structured in a format suitable for the component 130. For example, the content can include a label "Call with John Smith," a date/time Feb. 2, 2017 and 10:15 EST, and a text form containing an alphanumeric string "123-456-7890." The format can be a data or file type, which may be informative of entry type, such as a reminder.

The component 132 includes a messaging functionality, such as email, chat, over-the-top, or others. The component 132 includes a feed, a folder or label hierarchy for message organization. For example, the component 132 can include an inbox, a sent folder, an archive folder, or others. Note that labels can be used additionally or alternatively. At least one of the messages 132 can be marked with various flags, such as urgent, confirmation requested, and others. For example, the marking can be visually distinct, such as via color.

The component 134 can be any component of the PIM application 128, whether native to the PIM 128 or added on to the PIM application 128, such as a plug-in or extension. For example, the component 134 can include a task component, a notes component, a customer relationship manager (CRM) component, a social media component, or any others.

The client 106 can include and/or be coupled to, whether directly and/or indirectly, an input device, such as a mouse, a keyboard, a camera, whether forward-facing and/or back-facing, an accelerometer, a touchscreen, a biometric reader, a clicker, a microphone, or any other suitable input device. The client 106 can include and/or be coupled to, whether directly and/or indirectly, an output device, such as a display, a speaker, a headphone, a printer, or any other suitable output device. In some embodiments, the input device and the output device can be embodied in one unit, such as a touch-enabled display, which can be haptic.

The processor 124 comprises a plurality of independent cores. For example, the processor 124 is a computing component with two or more independent processing units, which are the units that read and execute the PIM application 128, such as via multiprocessing or multithreading. The instructions are processing instructions, such as add, move data, or branch, but the cores can run multiple instructions concurrently, thereby increasing an overall operational speed for the software application, which is amenable to parallel computing. The cores can process in parallel when concurrently accessing a file or any other data structure, as disclosed herein, while being compliant with ACID principles, which ensure that such data structure operations/transactions, such as read, write, erase, or others, are processed reliably. For example, a data structure can be accessed, such as read or written, via at least two cores concurrently without locking the data structure between such cores. Note that there can be at least two cores, such as two cores, three cores, four cores, six cores, eight cores, ten cores, twelve cores, or more. The cores may or may not share caches, and the cores may or may not implement message passing or shared-memory inter-core communication methods. Common network topologies to interconnect cores include bus, ring, two-dimensional mesh, and crossbar. Homogeneous multi-core systems include only identical cores, heterogeneous multi-core systems can have cores that are not identical. The cores in multi-core systems may implement architectures, such as VLIW, superscalar, vector, or multithreading.

The client 108 includes a multicore processor 136, a memory in communication with the processor 136, and a transceiver in communication with the processor 136. The memory stores an OS 138 and a PIM application 140. The transceiver, such as a transmitter and a receiver, signally communicates with the network 102, whether in a wired, waveguide, or wireless manner. The OS 138, such as MacOS or Windows, runs on the processor 136. The PIM application 140 runs on the OS 138. The PIM application 140 includes a messaging component 142. For example, the PIM application 140 can include Microsoft Outlook, whether provided as a stand-alone desktop/laptop application, a SaaS technique, or a mobile app.

The component 140 includes a messaging functionality, such as email, chat, over-the-top, or others. The component 140 includes a folder or label hierarchy for message organization. For example, the component 140 can include an inbox, a sent folder, an archive folder, or others. Note that labels can be used additionally or alternatively. The component 132 and the component 142 can send messages to each other.

The client 108 can include and/or be coupled to, whether directly and/or indirectly, an input device, such as a mouse, a keyboard, a camera, whether forward-facing and/or back-facing, an accelerometer, a touchscreen, a biometric reader, a clicker, a microphone, or any other suitable input device. The client 108 can include and/or be coupled to, whether directly and/or indirectly, an output device, such as a display, a speaker, a headphone, a printer, or any other suitable output device. In some embodiments, the input device and the output device can be embodied in one unit, such as a touch-enabled display, which can be haptic.

The processor 136 comprises a plurality of independent cores. For example, the processor 136 is a computing component with two or more independent processing units, which are the units that read and execute the PIM application 140, such as via multiprocessing or multithreading. The instructions are processing instructions, such as add, move data, or branch, but the cores can run multiple instructions concurrently, thereby increasing an overall operational speed for the software application, which is amenable to parallel computing. The cores can process in parallel when concurrently accessing a file or any other data structure, as disclosed herein, while being compliant with ACID principles, which ensure that such data structure operations/transactions, such as read, write, erase, or others, are processed reliably. For example, a data structure can be accessed, such as read or written, via at least two cores concurrently without locking the data structure between such cores. Note that there can be at least two cores, such as two cores, three cores, four cores, six cores, eight cores, ten cores, twelve cores, or more. The cores may or may not share caches, and the cores may or may not implement message passing or shared-memory inter-core communication methods. Common network topologies to interconnect cores include bus, ring, two-dimensional mesh, and crossbar. Homogeneous multi-core systems include only identical cores, heterogeneous multi-core systems can have cores that are not identical. The cores in multi-core systems may implement architectures, such as VLIW, superscalar, vector, or multithreading.

The tracker 110 is configured to monitor or track a fitness-related metric, such as a heartbeat of the user, a heart rate of the user, a blood pressure of the user, a distance walked or run of the user, a calorie consumption of the user, a quality of sleep of the user, or other health related characteristics. The tracker 110 includes a processor, a memory in communication with the processor, a transceiver in communication with the processor, and a health sensor in communication with the processor. The memory stores a set of instructions that is executable via the processor to sense a health metric via the health sensor and then send the health metric via the transceiver over the network 102, such as to the server 104 or the client 106. The tracker 110 can include a wristband or an armband, such as a Fitbit device, or be head-worn, such as headphone or ear bud, or foot-worn or leg-worn or be implanted into the user.

The printer 112 includes a processor, a memory in communication with the processor, a transceiver in communication with the processor, and a print head in communication with the processor. The printer 112 can be in communication with the network 102 via the transceiver or with the client 106 or the client 108 via the transceiver. The print head can print in black/white, grayscale, or monochrome. For example, the print head can print a barcode on a tangible medium, such as paper, rubber, metal, plastic, or others. The printer 112 can be stationary or mobile. The printer 112 can be a component of a multi-function device.

The device 114 can include a smartphone or a tablet. The device 114 can include a processor, a memory in communication with the processor, and a transceiver in communication with the processor. The device 114 can communicate with the network 102 via the transceiver. The device 114 can provide a communication session, such as via texting, chatting, emailing, over-the-top messaging, or others.

In one mode of operation, a first user, such as an office worker, operates the client 106, where the PIM application 128 receives a plurality of messages in the component 132 and stores a plurality of calendar entries in the component 130. The messages are marked as urgent and are dated to within twelve hours of each other. The calendar entries are overlapping with no free time slots in-between and are also dated to within the twelve hours with respect to the messages marked as urgent. As such, the first user may be stressed. Therefore, the chatbot application 120 is in communication with the PIM application 128 over the network 102 and thereby reads the messages in the component 132 and the calendar entries in the component 130. Then, the chatbot application 128 generates a value based on a set of algorithms internal to the chatbot application 128, although the value generation may be taking place in real-time, as the chatbot application 120 reads the PIM application 128, which may be continuing as long as the PIM application 128 is running on the OS 126. The value corresponds to a predicted user stress level based on a set of predetermined criteria internal to the chatbot application 120 and related to the messages marked as urgent and dated to within twelve hours of each other and the calendar entries overlapping with no free time slots in-between and are also dated to within the twelve hours with respect to the messages marked as urgent. If the first user is wearing the tracker 110 in communication with the PIM application 128 via the client 106, then the chatbot application 120 can query the tracker 110 via the PIM application 128 over the network 102 such that the tracker 110 sends a health metric to the chatbot application 120 via the PIM application 128 over the network 102. Subsequently, the chatbot application 120 can augment its knowledge and modify the value based on the health metric, if needed. Then, the chatbot application 120 evaluates the value against a set of values, such as organized in a data structure internal to the chatbot application 120, to determine what action should be taken, such as via the chatbot application 120, based on the instruction sets 122, which instruct the action. The data structure can be a data structure optimized for efficient search and retrieval, whether the data structure is static or dynamic. For example, the data structure can include an array, a binary search tree, a trie, a quadtree, a hash table, a heap, a linked list, a bit vector, a skip list, or any other suitable data structure, whether sorted or unsorted.

If a second user, such as a supervisor of the office worker, is operating the client 108, then the chatbot application 120 can instruct the PIM application 128 to communicate with the PIM application 140, such as via sending a message with preset content to be presented to the second user, such as the message being informative of the first user being very busy today. Also, the message may include prompting the second user for an input, such as a binary input, such as yes or no, to cause an event, such as an automated response with a barcode being sent from the PIM application 140 to the PIM application 128 or an automated print of the barcode via the printer 112, such as a restaurant coupon.

Figure 2:
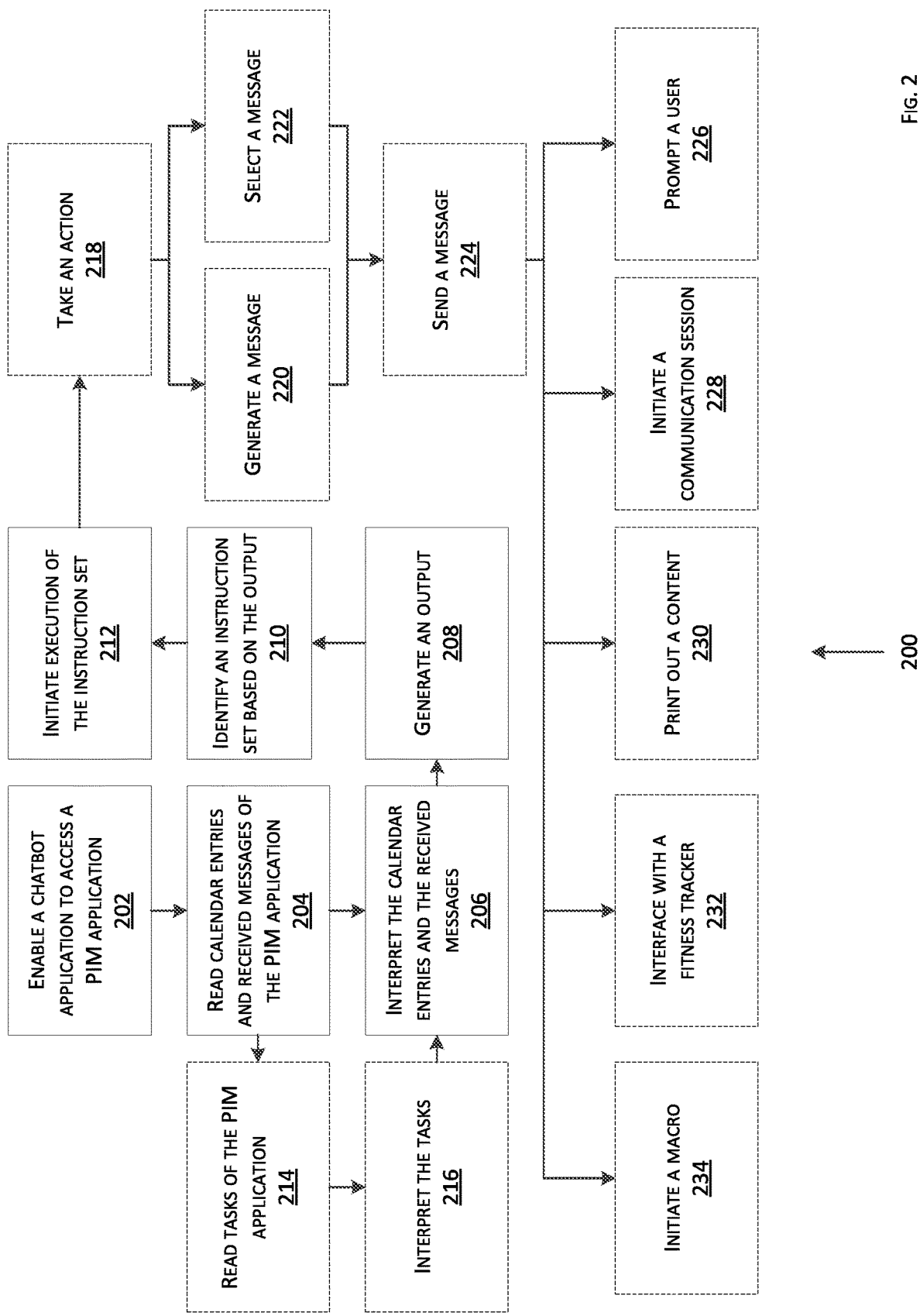
FIG. 2 shows a flowchart of an embodiment of a method for a chatbot application to interface with a PIM application according to this disclosure.

FIG. 2 shows a flowchart of an embodiment of a method for a chatbot application to interface with a PIM application according to this disclosure. A method 200 includes a set of block 202-234, which enable the chatbot application 120 to interface with the PIM application 128. The method 200 is performed using the topology 100, as shown in FIG. 1. For example, in FIG. 2, the server 104 hosts the chatbot application 120 and the instruction sets 122, whereas the PIM application 128 is hosted on the client 106 in communication with the server 104. However, note that variations of this configuration are possible. For example, the server 104 can host the chatbot application 120, the instruction sets 122, and the PIM application 128, where the server 104 is in communication with the client 106 accessing the PIM application 128 over the network 102, such in a SaaS technique. Likewise, the client 106 can host the chatbot application 120, the PIM application 128, and the instruction sets 122 such that the chatbot application 120 and the instruction sets 122 are local to the PIM application 128.

In the block 202, the server 104 enables the chatbot application 120 to access the PIM application 128 on the client 106. This can be done via the server 104 granting the chatbot application 120 a read permission to the PIM application 128 or disabling a security setting of the PIM application 128 to enable the chatbot application 120 to read the PIM application 128.

In the block 204, the chatbot application 120 reads a plurality of calendar entries and a plurality of received messages in the PIM application 128. The calendar entries are stored within the component 130 and the received message are stored in the component 132. This reading can include reading of at least two calendar entries and at least two messages, including any format, content, characteristic, or aspect thereof. For example, the chatbot application 120 can access the component 130 and read the calendar entries, including title, time, date, description, attachments, or any format, content, characteristic, or aspect thereof. Likewise, the chatbot application 120 can access the component 130 and read the received messages, such as sender, date, time, subject, body, carbon copy, action flag, attachments, or any format, content, characteristic, or aspect thereof. For example, the calendar entries can overlap with each other with respect to date and time and the received messages can be marked urgent and marked as received within a single day. At least one of the messages can include an email message. In some embodiments, the processor 116 includes a first core and a second core, where the first core reads the calendar entries concurrent to the second core reading the received messages without locking the PIM application 128. Such configuration enables efficient processing if the PIM application 128 stores many received messages and many calendar entries. Similar processing may occur for other components of the PIM application 128, such as task entries. In some embodiments, the processor 116, which may be a single or multicore processor, runs a first thread and a second thread, where the first thread reads the calendar entries and the second thread reads the received messages. Similar processing may occur for other components of the PIM application 128, such as task entries.

In the block 206, the chatbot application 120 interprets the calendar entries and the messages, as read in the component 130 and the component 132. This interpretation can include an NLP technique, a machine learning technique, an optical character recognition technique, or any other AI technique. For example, the machine learning technique can include a decision tree learning technique, an association rule learning technique, an artificial neural network technique, a deep learning technique, an inductive logic programming technique, a support vector machine technique, a clustering technique, a Bayesian network technique, a reinforcement learning technique, a representation learning technique, a similarity and metric learning technique, a sparse dictionary learning technique, a genetic algorithm technique, a rule-based machine learning technique, a learning classifier system technique, or any others.

In the block 208, the chatbot application 120 generates an output, such as a busyness factor, based on interpreting the calendar entries and the messages, as read in the component 130 and the component 132. The output can include a value, such as an alphanumeric value. The value can be a whole number or a decimal, in any mathematical notation. The chatbot application 120 generates this value based on a set of algorithms internal to the chatbot application 128, although the value generation may be taking place in real-time, as the chatbot application 120 reads the PIM application 128, which may be continuing as long as the PIM application 128 is running on the OS 126. The value corresponds to a predicted user stress level based on a set of predetermined criteria, which are updatable, internal to the chatbot application 120 and related to the messages marked as urgent and dated to within twelve hours of each other and the calendar entries overlapping with no free time slots in-between and are also dated to within the twelve hours with respect to the messages marked as urgent. For example, with respect to the calendar entries, as the calendar entries overlap with each other in one or more aspects, such as date/time or content, then the chatbot application 120 assigns more weight, such as by incrementing the value, to such overlap and thereby increases the value or vice versa. Likewise, with respect to the received messages, as the received messages overlap with each other in one or more aspects, such as date/time or content or flags, such as an urgency marking, then the chatbot application 120 assigns more weight, such as via incrementing the value, to such overlap and thereby increases the value or vice versa.

If the first user is wearing the tracker 110 in communication with the PIM application 128 via the client 106, then the chatbot application 120 can query the tracker 110 via the PIM application 128 over the network 102 such that the tracker 110 sends a health metric to the chatbot application 120 via the PIM application 128 over the network 102. The health metric can augment the chatbot application 120 in generating the output. For example, if the health metric is informative of a high heart rate, then the chatbot application 128 can infer that a wearer thereof is stressed and as such, increase the value or vice versa. As such, the chatbot application 120 can augment its knowledge and modify the value based on the health metric, if needed.

In the block 210, the chatbot application 120 identifies an instruction set from the instruction sets 122 based on the output. Such identification can be based on the value being selected from a plurality of values stored in a data structure to which the chatbot application 120 has access, such as read or write access. For example, the instruction set can correspond to the value, such as by being stored in the data structure that has a copy of the value associated therewith, such as in a tabular format. Therefore, if the copy of the value and the value match in content, then the instruction set has been identified via the chatbot application 120. The data structure can be a data structure optimized for efficient search and retrieval, whether the data structure is static or dynamic. For example, the data structure can include an array, a binary search tree, a trie, a quadtree, a hash table, a heap, a linked list, a bit vector, a skip list, or any other suitable data structure, whether sorted or unsorted. Note that the value can also be within a range associated with the instruction set, and as such, if the value is evaluated to be within the range corresponding to the instruction set, then the instruction set has been identified via the chatbot application 120.

In the block 212, the chatbot application 212 initiates execution of the instruction set, as identified. Alternatively, the chatbot application 212 executes the instruction set or causes or enables a logical entity, such as a hardware device or a software application, to execute the instruction set.

In the block 214, the chatbot application 120 reads a plurality of task entries in the PIM application 128. The task entries are stored within the component 134. This reading can include reading of at least two task entries, including any format, content, characteristic, or aspect thereof. For example, the chatbot application 120 can access the component 134 and read the task entries, including title, time, date, description, attachments, or any format, content, characteristic, or aspect thereof. For example, the task entries can overlap with each other with respect to date and time. Note that the task entries and the calendar entries can overlap with each other, as disclosed herein. This gets taken into consideration by the chatbot application 120 and weighted accordingly. For example, the chatbot application 120 can be programmed to give higher weight to the calendar entries than the task entries, if overlap is detected.

In the block 216, the chatbot application 120 interprets the task entries, as read in the component 134. This interpretation can include an NLP technique, a machine learning technique, an optical character recognition technique, or any other AI technique. For example, the machine learning technique can include a decision tree learning technique, an association rule learning technique, an artificial neural network technique, a deep learning technique, an inductive logic programming technique, a support vector machine technique, a clustering technique, a Bayesian network technique, a reinforcement learning technique, a representation learning technique, a similarity and metric learning technique, a sparse dictionary learning technique, a genetic algorithm technique, a rule-based machine learning technique, a learning classifier system technique, or any others.

In some embodiments, the chatbot application 120 can mix what the chatbot application 120 reads in the PIM application 128. For example, the chatbot application 120 can read the calendar entries and the task messages, but skip the received messages. Alternatively, the chatbot application 120 can read the received messages and the task messages, but skip the calendar entries. As such, although FIG. 2 shows that the blocks 214, 216 are optional, any combination between the blocks 204-206 and 214-216 is possible, just like any other block shown in FIG. 2. Similarly, the blocks 218-234 are optional, but can be combined in any way.

In the block 218, the chatbot application 120 takes an action. The action can be any action. The action can be with respect to the network 102, the server 104, the client 106, the client 108, the fitness tracker 110, the printer 112, the mobile device 114, or anything else disclosed in FIG. 1, such as with respect to the PIM application 128. For example, the action can include retrieving and displaying an image to the user of the PIM application 128, such as via the PIM application 128 or the chatbot application 120 or any other logic local to or remote from the client 106. The image can be preset by the user, such as when the image has a calming effect on the user, such as a family photo. For example, the action can include a PIM application action, such as archive or move a message, reschedule a calendar or task entry, notify other clients, respond to a message, or any other PIM application related action.

In the block 220, the chatbot application 120 generates a message based on a set of logic internal or external to the chatbot application 120. The message can be generated based on or as instructed via the instruction set of the block 210. For example, a content of the message can be generated via the PIM application 128 or the chatbot application 120 or any other logic local to or remote from the client 106. The content can be preset by the user of the PIM application 128, such as when the content has a calming effect on the user, such as a phrase. The content can include a hyperlink.

In the block 222, the chatbot application 120 can select a message from a plurality of predetermined messages based on a set of logic internal or external to the chatbot application 120. The predetermined message can be selected based on or as instructed via the instruction set of the block 210. For example, the predetermined messages can be selected via the PIM application 128 or the chatbot application 120 or any other logic local to or remote from the client 106. The predetermined messages can be preset by the user of the PIM application 128, such as when the predetermined messages have a calming effect on the user, such as a poem. The content can include a hyperlink.

In the block 224, the chatbot application 120 can send the message whether over the network 102 or directly to the client 106, the client 108, the fitness tracker 110, the printer 112, the mobile device 114, or anything else disclosed in FIG. 1. For example, the message can be sent between a plurality of processors, including when the processors are remote from each other. The message can be configured to appear as if coming from the PIM application 128 or be actually coming from the component 132.

In the block 226, the message can prompt a receiving user for an input. For example, if the receiving user is operating the PIM application 140, then the message received via the component 142 can prompt for the user input, which may be binary, such as yes or no. The user input can be of any type, such as a sound, an image, a text, a gesture, or others, through any type of an input device, such as a camera, a microphone, a keyboard, whether virtual or physical, or any other. The user input may initiate a set of events, such as the block 228, the block 230, or the block 234. For example, the prompt can inquire the receiving user whether a lunch should be ordered for the user of the PIM application 128, such as when the user of the PIM application 128 is stressed, as interpreted in light of the chatbot application reading the PIM application 128. If the receiving user responds with yes, then chatbot application 120 may place a request with a preset network server or the PIM application 128 or the PIM application 140 can response with a suitable message. The request may be preprogrammed in advance. As such, request-response computing method may be implemented.

In the block 228, the message can initiate a communication session with the mobile device 114, as preset in advance, such as via querying a local or remote data source or a user of the client 106, or heuristically. For example, a network address, such as a phone number or screen name, can be preset by the user of the PIM application 128 or be availed via the server 104, including the chatbot application 120. The communication session can include email, chat, texting, over-the-top messaging, or others. For example, the mobile device 114 may be operated by a spouse of the user of the PIM application 128.

In the block 230, the message can be sent to the printer 112 such that the printer 112 can automatically print out a content for the user of the PIM application 128. For example, the content can include a barcode, such as a discount coupon for a meal. This automatic print out can be without prompting the user of the PIM application 128 or the PIM application 140.

In the block 232, the message can enable interfacing with the tracker 110, if the tracker has been detected for uses as disclosed herein. For example, the interfacing can be wireless via the transceiver of the client 106 and the tracker 110.

In the block 234, the message can initiate a macro on the PIM application 128. The macro can be of any type. The macro can be performed via the PIM application 128 or the PIM application 140. For example, the macro can send a set of messages to a group of servers or clients predetermined in advance.

Figure 3:
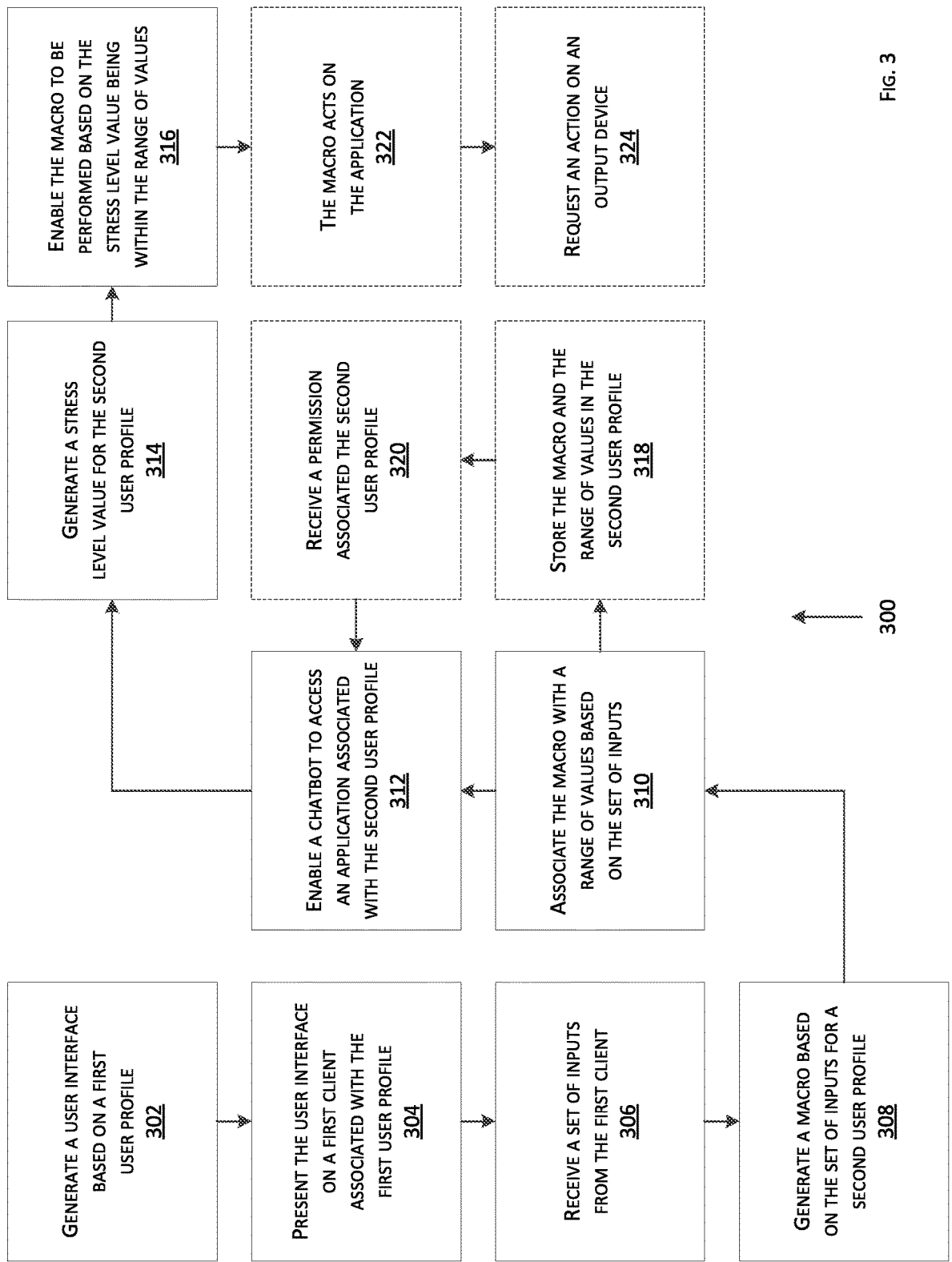
FIG. 3 shows a flowchart of an embodiment of a method for a chatbot application to perform a task based on a macro according to this disclosure.

FIG. 3 shows a flowchart of an embodiment of a method for a chatbot application to perform a task based on a macro according to this disclosure. A method 300 includes a set of blocks 302-322, which enable the chatbot application 120 to interface with the PIM application 128 in order to perform the task based on the macro. The method 300 is performed using the topology 100, as shown in FIG. 1.

In the block 302, the server 104 generates a graphical user interface based on a first user profile. The graphical user interface may be generated via a logic, whether hardware or software, whether local to or remote from the server 104, such as an object code, a markup code, a source code, a script, or others. This generation may be static or dynamic, such as based on a set of criteria, which may be determined on-the-fly. The graphical user interface can be of any type and can include any set of data output elements, whether textual or graphical, and can include any set of data input elements, such as a textbox, a button, a slider, a dial, a hyperlink, a pop-up, a slide-out, a menu, an icon, a ribbon, or any others. For example, the user interface can be generated based on a file containing an Extensible Markup Language (XML) code, a Hypertext Markup Language (HTML) code, a site or permission object, a function, a key/key group (name, delimiter, value), an initialization (INI) file, or others.

The first user profile can include or be included in a data structure, such as a file or a database record, that contains a set of user settings or preferences, whether inherited from a default setting or value or amended from the default setting or value. For example, the first user profile can include a file with a plurality of user preferences or values for operating the PIM application 140, whether inherited or retrieved from the client 108 or locally stored, or another application, whether local or network-based. As a result, the graphical user interface is generated to receive a set of inputs for generation of the macro and association of the macro with a trigger condition.

In the block 304, the server 104 presents, such as over the network 102, the graphical user interface on a first client, such as the client 108, associated with the first user profile, with the graphical interface depicting the set of input elements. For example, the server 104 can serve the graphical user interface to the client 108, such as to an application running on the client 108, such as a network browser. The first client is in communication with the server 104 over the network 102 based on the first user profile via a client access control logic, whether hardware or software, hosted on or accessible to the server 104. For example, the client access control logic can control access to the server 104 via logins/passwords/biometrics received from the client 108, with the logins/passwords/biometrics being associated with the first user profile.

The set of input elements, whether presented on a single page or a plurality of pages of the graphical user interface, can include any type of input element, such as a textbox, a button, a slider, a dial, a hyperlink, a pop-up, a slide-out, a menu, an icon, or any others that allow for an input, such as an alphanumeric input, an image input, an acoustic input, or other, such as via a keyboard, whether physical or virtual, a display, including haptic, a mouse, a camera, a microphone, or others. On the graphical user interface, the set of input elements is visually associated, such as being positioned in proximity, with a set of data presentation elements, such as alphanumeric labels, images, or others, whether presented on a single page or a plurality of pages.

Once presented on the first client, the graphical user interface enables a user of the first client to input a set of logic parameters, such as a Boolean logic parameter or a causal conditional for the macro generation and association of the macro with the trigger condition. For example, the logic parameters can include keywords, alphanumeric string patterns, values, image patterns, sound patters, or any other content for triggering the macro. For example, the logic parameters can include a triggered action, such as read a specified data or a directory (local or remote), write a specified data to a file or directory (local or remote), delete a specified data or a directory (local or remote), send a specified data to a specified device/application or a directory (local or remote), receive a specified data from a specified device/application or a directory (local or remote), sorting a specified data at a specified device/application or a directory (local or remote), search for a specified data at a specified device/application or a directory (local or remote), create a specified data at a specified device/application or a directory (local or remote). These action can occur on data/directories on the server 104, the first client, or any other member of the topology 100. As a result, the graphical user interface is ready to receive a set of inputs for generation of the macro and association of the macro with a trigger condition.

In the block 306, the server 104 receives, such as over the network 102, the set of inputs from the set of input elements, as presented on the first client. The set of inputs can include alphanumeric, binary, image, acoustic, or other values. The set of inputs contain the set of logic parameters, as noted above.

In the block 308, the server 104 generates the macro for a second user profile based on the set of inputs. The macro may be generated via a logic, whether hardware or software, whether local to or remote from the server 104, such as an object code, a markup code, a source code, a script, or others. This generation may be static or dynamic, such as based on a set of criteria, which may be determined on-the-fly. The generation may include creating a data structure, such as a file, and writing a logic based on the set of inputs into the data structure. For example, the logic can include a Boolean logic or a causal conditional. For example the logic can instruct the PIM application 128 or the chatbot application 120 to identify a received message, a calendar entry, or a task entry as having certain criteria or content, and then have the PIM application 128 or the chatbot application 120 take a specified action, whether local to or remote from the PIM application 128 or the chatbot application 120.

In some embodiments, the macro can be generated via a macro generator, such as a logic having a graphical user interface programmed for receiving a user input and thereby creating the macro based on the input, where a user enters a record mode and can input or select a sequence of actions to perform, whether via a cursor, a keyboard, whether physical or virtual, a touchscreen gesture, or other. The sequence of actions (i.e., the macro) can be stored in a macro file and a set of actions are added to the macro file until the record mode is halted by some action of the user, such as a halt command. The macro file can be packaged in an application and stored in a form that can later be executed by the application or another form of logic. When the macro is calling a web service, then the macro generator can generate a set of security information, such as a signature, a token, a policy, a command provided by an author of the macro or an operator of the web service, or others. The macro generator can insert the set of security information into the macro such that when the macro calls the web service, then the set of security information authenticates and authorizes the web service to respond to the macro due to detection of an appropriate authority based on the set of security information.

In some embodiments, the macro can be an embedded macro where the embedded macro establishes logic for an object property that defines an action that executes when an event triggers. When an embedded macro is associated with an event, a regular event property value is set to an empty string and a shadow property associated with the regular event property is created. An application that supports embedded macros recognizes the empty regular property value as an indicator that a macro is embedded in the event. A binary representation of the macro is accessed from the shadow property and is executed when the event associated with the embedded macro triggers. An action safe list identifies trusted embedded macro actions. Embedded macro actions not included on the safe list are not executed such that untrusted actions are blocked from execution.

In some embodiments, when the macro is personalized for a user profile, then the macro can be configured accordingly, such as via a set of information that is accessed that indicates a set of content selected by or accessible to the user profile, such as a web page, a communication contact, a data feed, or others. For example, the macro generator can create a macro by which a plurality of commands corresponding to a user' selected objects are combined and created as a single macro command thereby enabling the user to perform a predetermined macro command function in an easy, convenient manner, which can include a combination of a plurality of commands, without performing a complicated menu selection procedure. For example, the macro can be forward-compatible by inputting an input into a logic to trigger a response that is recorded, where the macro includes an instruction that requests the logic involved to re-establish its particular state that caused the logic to provide a particular response.

In some embodiments, the macro generator can be a component of a macro program management system for facilitating edit operations of macro programs by clarifying associations between objects on a worksheet and macro programs. The macro program management system is equipped with a name information extraction unit for extracting names of worksheets, objects, and macro programs from application programs, and name list generation unit for listing the extracted names. This name list clarifies the association among the worksheets, objects, and macros. Further, the system has a listing/editing switching unit, coupled to the name list generation unit and to the macro editing unit, for switching the display screen either to a screen for showing the name list or to another screen for editing a macro program. With this unit, the operator can alternately select the listing screen or macro edit screen, thus facilitating development and maintenance of the application program.

In some embodiments, the macro can be a cross-platform/OS by having the macro being embedded in a macro file including at least two versions of executable configuration code corresponding to two different operating systems to interface the macro file to an application program. Attached to the macro file is a sequence of actions to apply to an application file produced by the application program. Also attached is application identification information that identifies an original host application corresponding to the macro. The sequence of actions in the macro file can be produced by storing commands, applied to a data file opened in the application program, into a log file and transferring at least one stored command from the log file to the macro file.

Since the macro can be complicated, the macro can be embedded in a macro file including at least two versions of executable configuration code corresponding to two different operating systems to interface the macro file to an application program. Attached to the macro file is a sequence of actions to apply to an application file produced by the application program. Also attached is application identification information that identifies an original host application corresponding to the macro. The sequence of actions in the macro file can be produced by storing commands, applied to a data file opened in the application program, into a log file and transferring at least one stored command from the log file to the macro file. For example, the macro can include any action as disclosed with respect to the blocks 218-234, as described with reference to FIG. 2.

The macro, which may include a set of alphanumeric strings or values, can be of any type as known to skilled artisans. The macro is generated for the second user profile, such as via being associated therewith, whether as recorded in the macro or the second user profile or another data structure, such as a record or a record field. The second user profile can include or be included in a data structure, such as a file or a database record, that contains a set of user settings or preferences, whether inherited from a default setting or value or amended from the default setting or value. For example, the first user profile can include a file with a plurality of user preferences or values for operating the PIM application 128, whether inherited or retrieved from the client 106 or locally stored, or another application, whether local or network-based. With respect to the server 104, the first user profile may have more or higher level access privileges than the second user profile, such as in a supervisor-supervisee environment. For example, the first user profile may be associated with the client 108, such as via a login/passwords/biometrics associated with the first user profile, and the second user profile may be associated with the client 106, such as via a login/passwords/biometrics associated with the second user profile. As a result, the macro is generated based on the set of inputs.

In the block 310, the server 104 associates the macro with a range of values based on the set of inputs. The macro may be associated with the range of values, such as via writing the range of values into the macro or having the range of values be recorded in a data structure distinct from the macro, such as a file, a record field, or others, with the macro and the range of values being related to each other, such as via a primary key in a relational database hosted via or accessible to the server 104. The range of values can be any range of any type as known to skilled artisans. For example, the range of values can span from about 0 to about 5. Note that the range of values can be a sub-range within a greater range. For example, the greater range may be from about 0 to about 15, with the sub-ranges being 0 to 5, 6 to 10, and 11-15, inclusively. However, note that the sub-ranges may also be unequally spaced apart. For example, the greater range may be from about 0 to about 15, with the sub-ranges being 0 to 6, 7 to 9, and 10-15, inclusively. As a result, the macro is associated with the range of values based on the set of inputs.

In the block 312, the server 104 enables the chatbot application 120 to access an application associated with the second profile, such as the PIM application 128 on the client 106. Since the server 104 hosts the chatbot application 120, then such enabling may occur in various ways. For example, the server 104 may enable the chatbot application 120 to access the application associated with the second profile via presenting, such as via serving, a user prompt at the client 106, such as via the application 128, a network browser application running on the OS 126, a messenger application running on the OS 126, or the OS 126. The user prompt can be a binary prompt, such as yes or no to enable the chatbot application 120 to access the application. The binary prompt can be generated via ActiveX, Flash, HTML5 or other technologies. Likewise, for example, the server 104 may enable the chatbot application 120 to access the application associated with the second profile via an administrator or supervisor user profile policy, such as set, supervised, or monitored via the client 108, with the administrator or supervisor policy policing the PIM application 128, with the administrator or supervisor policy being hosted on or accessible to the server 104. Similarly, for example, the server 104 may enable the chatbot application 120 to access the application associated with the second profile via the application being configured to grant such access by default.

Note that the access for the chatbot application 120 can include at least one of read access, write access, delete access, or others. For example, the access can include the chatbot application 120 reading a plurality of calendar entries and a plurality of received messages in the PIM application 128. The calendar entries are stored within the component 130 and the received message are stored in the component 132. This reading can include reading of at least two calendar entries and at least two messages, including any format, content, characteristic, or aspect thereof. For example, the chatbot application 120 can access the component 130 and read the calendar entries, including title, time, date, description, attachments, or any format, content, characteristic, or aspect thereof. Likewise, the chatbot application 120 can access the component 130 and read the received messages, such as sender, date, time, subject, body, carbon copy, action flag, attachments, or any format, content, characteristic, or aspect thereof. For example, the calendar entries can overlap with each other with respect to date and time and the received messages can be marked urgent and marked as received within a single day. At least one of the messages can include an email message. In some embodiments, the processor 116 includes a first core and a second core, where the first core reads the calendar entries concurrent to the second core reading the received messages without locking the PIM application 128. Such configuration enables efficient processing if the PIM application 128 stores many received messages and many calendar entries. Similar processing may occur for other components of the PIM application 128, such as task entries. In some embodiments, the processor 116, which may be a single or multicore processor, runs a first thread and a second thread, where the first thread reads the calendar entries and the second thread reads the received messages. Similar processing may occur for other components of the PIM application 128, such as task entries.

Based on the chatbot application 120 reading the calendar entries and the received messages in the PIM application 128, the chatbot application 120 interprets the calendar entries and the messages, as read in the component 130 and the component 132. This interpretation can include an NLP technique, a machine learning technique, an optical character recognition technique, or any other AI technique. For example, the machine learning technique can include a decision tree learning technique, an association rule learning technique, an artificial neural network technique, a deep learning technique, an inductive logic programming technique, a support vector machine technique, a clustering technique, a Bayesian network technique, a reinforcement learning technique, a representation learning technique, a similarity and metric learning technique, a sparse dictionary learning technique, a genetic algorithm technique, a rule-based machine learning technique, a learning classifier system technique, or any others. As a result, the chatbot application 120 access the application associated with the second profile.

In the block 314, the server 104 generates a user stress level value based on the chatbot application 120 accessing the PIM application 128 on the client 106 associated with the second user profile. The user stress level value is generated based on interpreting the calendar entries and the messages, as read in the component 130 and the component 132. The user stress level value can include an alphanumeric value. The value can be a whole number or a decimal, in any mathematical notation. The chatbot application 120 generates this value based on a set of algorithms internal to the chatbot application 128, although the value generation may be taking place in real-time, as the chatbot application 120 reads the PIM application 128, which may be continuing as long as the PIM application 128 is running on the OS 126. The value corresponds to the user stress level based on a set of predetermined criteria, which are updatable, internal to the chatbot application 120 and related to the messages marked as urgent and dated to within twelve hours of each other and the calendar entries overlapping with no free time slots in-between and are also dated to within the twelve hours with respect to the messages marked as urgent. For example, with respect to the calendar entries, as the calendar entries overlap with each other in one or more aspects, such as date/time or content, then the chatbot application 120 assigns more weight, such as by incrementing the value, to such overlap and thereby increases the value or vice versa. Likewise, with respect to the received messages, as the received messages overlap with each other in one or more aspects, such as date/time or content or flags, such as an urgency marking, then the chatbot application 120 assigns more weight, such as via incrementing the value, to such overlap and thereby increases the value or vice versa. As a result, the server 104 generates the user stress level value based on the chatbot application 120 accessing the PIM application 128 on the client 106 associated with the second user profile.

In the block 316, the server 104 enables the macro to be performed based on the stress level value being with the range of values, as per the block 310. For example, if the stress level value, such as 2, is within the range of values, such as 0 to 5, then the server 104 may enable the macro to be performed. Such performance may be local to, remote from, or via any member of the topology 100, as shown in FIG. 1. For example, the server 104 may enable the chatbot application 120 to perform the macro on the PIM application 128. This may be enabled in various ways. For example, the chatbot application 120 may access the PIM application 128 and perform an action or a task as per the macro, whether with respect to the PIM application 128 or any member of the topology 100, as shown in FIG. 1. Also, the server 104 may re-use a permission to access the PIM application 128, as may have been previously granted via the user prompt on the client 106. Similarly, the server 104 may employ the administrator or supervisor user profile policy, as might have been previously used to access the PIM application 128. For example, the chatbot application 120 can perform the macro to send a set of messages to a group of servers or clients as predetermined in advance.

In some embodiments, the server 104 generates the macro based on the second user profile, such as based on a content or an organization of the content in the second user profile.

For example, the server 104 can generate the macro based on a set of user preferences or settings, as stored in the second user profile, which may be a set of default user preferences or settings. However, a user associated with the first user profile, such as a supervisor, or a user associated with the second user profile, such as a supervisee, may edit the default user preferences or settings in the second user profile, such as via the server 104 receiving an input from the client associated with the first user profile, such as the client 108, or from the client associated with the second user profile, such as the client 106, and storing the input in the second user profile, with the macro being generated based on the input, including when the input modifies a default setting in the second user profile, with the input including a set of alphanumeric content, an image content, an acoustic content, or others. For example, the user of the client associated with the second user profile, such as the client 106, may desire the PIM application 128 to present a predetermined image or a type of image when the stress level value is within the range of values. However, the macro or the second user profile may be configured from default to preclude display of any images when the stress level value is within the range of values. As such, the user of the client associated with the second user profile, such as the client 106, or the user of client associated with the first user profile, such as the client 108, may modify the macro or the second user profile to override or enable such functionality such that the PIM application 128 can present a predetermined image or a type of image when the stress level value is within the range of values. For example, in order to preclude display of inappropriate imagery, the server 104 may employ content filtering on the image before or during implementation of this functionality. Note that this functionality is not limited to images and any content or any action can be used or be performed, such as initiating a communication session, reading/modifying/deleting a data structure, sending a message, outputting a sound, or others, as disclosed herein.

In the block 318, the server 104 may store the macro and the range of values in the second user profile. For example, this storage may occur via the server 104 writing, which may involve copying, the macro and the range of value into the second user profile, which may include amending various values or settings in the second user profile, which may include default settings.

In the block 320, the server 104 may receive, such as over the network 102, a permission, such as an alphanumeric value, associated with the second user profile, such as from the second client, such as the client 106. The permission may be responsive to the user prompt. For example, the server 104 may enable the chatbot application 120 to access the application associated with the second profile via presenting, such as via serving, the user prompt at the client 106, such as via the application 128, a network browser application running on the OS 126, a messenger application running on the OS 126, or the OS 126. The user prompt can be a binary prompt, such as yes or no to enable the chatbot application 120 to access the application. The binary prompt can be generated via ActiveX, Flash, HTML5 or other technologies. The permission contains a response to the binary prompt, such as a binary input, such as yes or no.

In the block 322, the server 104, such as via the chatbot application 120, performs the macro on the application associated with the second user profile, such as the PIM application 128. For example, the chatbot application 120 may access the PIM application 128 and perform an action or a task as per the macro, with respect to the PIM application 128. For example, the chatbot application 120 can perform the macro to send a set of messages to a group of servers or clients as predetermined in advance. In some embodiments, at least one of the client 106 or the client 108 performs the macro.

In the block 324, the server 104, such as via the chatbot application 120, may request an action on an output device. For example, the action can include a request to print out a message without prompting the client 106 or the client 108, such as a barcode, via the printer 112 or a request to a voice/image/chat communication session with the mobile device 114, as preset in advance, or any others.

FIG. 4 shows a flowchart of an embodiment of a method for a chatbot application to track a plurality of stress levels on a plurality of clients according to this disclosure. A method 400 includes a set of blocks 402-420, which enable the chatbot application 120 to interface with a plurality of PIM application 128 in order to track the stress levels on the clients. The method 400 is performed using the topology 100, as shown in FIG. 1.

In the block 402, the server 102 hosts the chatbot application 120.

In the block 404, the server 104, such as via the chatbot application 120, accesses a plurality of PIM applications 128 hosted, which may include running, on the clients 106, 108, and others, such as within a LAN. Since the server 104 hosts the chatbot application 120, then such access may occur in various ways, which may be periodic, such as every 30 minutes (or less or more inclusively), or an hourly or daily or weekly basis. For example, the server 104 may enable the chatbot application 120 to access the PIM applications 128, whether in series or in parallel, via presenting, such as via serving, whether in series or in parallel, a plurality of user prompts at the clients, such as via the PIM applications 128, a plurality of network browser applications running on a plurality of OS on the clients, a plurality of messenger applications running on the OS on the clients, or the OS of the clients. At least some of the user prompts can be a binary prompt, such as yes or no to enable the chatbot application 120 to access the PIM application 128. The binary prompt can be generated via ActiveX, Flash, HTML5 or other technologies. Likewise, for example, the server 104 may enable the chatbot application 120 to access the PIM applications 128 via an administrator or supervisor user profile policy, such as set, supervised, or monitored via the client 108, with the administrator or supervisor policy policing the PIM application 128, with the administrator or supervisor policy being hosted on or accessible to the server 104. Similarly, for example, the server 104 may enable the chatbot application 120 to access the PIM applications 128 via the PIM applications 128 being configured to grant such access by default.

Note that the access for the chatbot application 120 can include at least one of read access, write access, delete access, or others. For example, for each of the PIM applications 128, the access can include the chatbot application 120 reading a plurality of calendar entries and a plurality of received messages in the PIM application 128. The calendar entries are stored within the component 130 and the received message are stored in the component 132. This reading can include reading of at least two calendar entries and at least two messages, including any format, content, characteristic, or aspect thereof. For example, for each of the PIM applications 128, the chatbot application 120 can access the component 130 and read the calendar entries, including title, time, date, description, attachments, or any format, content, characteristic, or aspect thereof. Likewise, the chatbot application 120 can access the component 130 and read the received messages, such as sender, date, time, subject, body, carbon copy, action flag, attachments, or any format, content, characteristic, or aspect thereof. For example, the calendar entries can overlap with each other with respect to date and time and the received messages can be marked urgent and marked as received within a single day. At least one of the messages can include an email message. In some embodiments, the processor 116 includes a first core and a second core, where the first core reads the calendar entries concurrent to the second core reading the received messages without locking the PIM applications 128, whether such reading occurs with respect to one of the PIM applications 128 or several of the PIM applications 128. For each of the PIM applications 128, such configuration enables efficient processing if the PIM application 128 stores many received messages and many calendar entries. Similar processing may occur for other components of the PIM application 128, such as task entries. In some embodiments, for each of the PIM applications 128, the processor 116, which may be a single or multicore processor, runs a first thread and a second thread, where the first thread reads the calendar entries and the second thread reads the received messages. Similar processing may occur for other components of the PIM application 128, such as task entries.

For each of the PIM applications 128, based on the chatbot application 120 reading the calendar entries and the received messages in the PIM application 128, the chatbot application 120 interprets the calendar entries and the messages, as read in the component 130 and the component 132. This interpretation can include an NLP technique, a machine learning technique, an optical character recognition technique, or any other AI technique. For example, the machine learning technique can include a decision tree learning technique, an association rule learning technique, an artificial neural network technique, a deep learning technique, an inductive logic programming technique, a support vector machine technique, a clustering technique, a Bayesian network technique, a reinforcement learning technique, a representation learning technique, a similarity and metric learning technique, a sparse dictionary learning technique, a genetic algorithm technique, a rule-based machine learning technique, a learning classifier system technique, or any others. As a result, the chatbot application 120 access the PIM applications 128, whether serially or in parallel.

In the block 406, the server 104 generates a plurality of user stress level values based on the chatbot application 120 accessing the PIM applications 128. The user stress level values are generated based on interpreting the calendar entries and the messages, as read in the component 130 and the component 132 for each of the PIM applications 128. The user stress level values can be alphanumeric values. At least some of the user stress level values can be a whole number or a decimal, in any mathematical notation. The chatbot application 120 generates the user stress level values based on a set of algorithms internal to the chatbot application 128, although the value generation may be taking place in a deferred manner or in real-time, as the chatbot application 120 reads each of the PIM applications 128, which may be continuing as long as the PIM applications 128 are running. For each of the PIM applications 128, the user stress level values correspond to the user stress levels based on a set of predetermined criteria, which are updatable, internal to the chatbot application 120 and related to the messages marked as urgent and dated to within twelve hours of each other and the calendar entries overlapping with no free time slots in-between and are also dated to within the twelve hours with respect to the messages marked as urgent. For example, for each of the PIM applications 128, with respect to the calendar entries, as the calendar entries overlap with each other in one or more aspects, such as date/time or content, then the chatbot application 120 assigns more weight, such as by incrementing the value, to such overlap and thereby increases the value or vice versa. Likewise, for each of the PIM applications 128, with respect to the received messages, as the received messages overlap with each other in one or more aspects, such as date/time or content or flags, such as an urgency marking, then the chatbot application 120 assigns more weight, such as via incrementing the value, to such overlap and thereby increases the value or vice versa. As a result, the server 104 generates the user stress level values based on the chatbot application 120 accessing the PIM applications 128.

In the block 408, the server 104 aggregates the user stress level values into a content, such as an alphanumeric value, a hexadecimal value, an image, a sound, a barcode, a document, a table, a diagram, a graphic, or others. The server 104 may aggregate the user stress level values into the content in various ways. For example, the aggregation may include determining an average value, a median value, a mode value, a sum value, a standard deviation, or others. For example, the aggregation can include fitting, combining, or fusing a plurality of images or text/numbers or knowledge bases into a single image or text/number or knowledge base.

In the block 410, the server 104 takes an action based on the content. The action can be with respect to any member of the topology 100 as shown in FIG. 1. The action can be taken upon the aggregation of the user stress level values into the content or upon comparing the content against a threshold, whether local to or remote from the server 104. For example, the server 104 can compare the content against the threshold and if the content satisfies the threshold, then the server 104 can take the action. The action can be of any type, such as reading/writing/deleting a datum or a data structure or sending a message or requesting that an output device output an output, such as any member of the topology 100 in FIG. 1, such as via the server 104 sending a message to the client 108, such as when the client 108 is an administrator of the server 104. For example, the action can include a request to print out a message without prompting the client 106 or the client 108, such as a barcode, via the printer 112 or a request to a voice/image/chat communication session with the mobile device 114, as preset in advance, or any others. For example, the action can include the server 104 broadcasting a message to the clients, with the message including the content or being informative of the content. For example, the action can include the server 104 reading a set of criteria or rules hosted on or accessible to the server 104, applying the set of criteria or rules to the content, and then inserting that content into a message sent to the client 106 or the clients. For example, the action can include the server 104 tracking the content over a time period, such as an hour, a day, a week, a month, a year, including any periods in-between, whether lesser or greater. The server 104 may determine how the content changes over the time period and output a content report over the network 102 on the client 106 based on such determining responsive to a query from the client 106. Similarly, the server 104 may generate a baseline value based on such determining and may output over the network 102 the baseline value to the client 106 responsive to a query from the client 106. Likewise, the server 104 may track the baseline value of the time period, determine how the baseline value changes over the time period, and output a baseline value report based on the determining responsive to a query from the client 106.

In the block 412, the server 104 receives, such as over the network 102, a plurality of permissions, such as various alphanumeric values, from the clients. For example, at least some of the permissions can be associated with user profiles for the PIM applications 128 and may be responsive to the user prompts. The server 104 may enable the chatbot application 120 to access the PIM applications 128 associated with the user profiles via presenting, such as via serving, the user prompts at the clients, as disclosed herein, where the user prompts can be binary prompts, such as yes or no to enable the chatbot application 120 to access the respective PIM application 128. The binary prompts can be generated via ActiveX, Flash, HTML5 or other technologies. The permissions contains responses to the binary prompts, such as binary inputs, such as yes or no.

In the block 414, the server 104 reads the received messages or the calendar entries in parallel or via threads. The access for the chatbot application 120 can include at least one of read access, write access, delete access, or others. For example, for each of the PIM applications 128, the access can include the chatbot application 120 reading a plurality of calendar entries and a plurality of received messages in the PIM application 128. The calendar entries are stored within the component 130 and the received message are stored in the component 132. This reading can include reading of at least two calendar entries and at least two messages, including any format, content, characteristic, or aspect thereof. For example, for each of the PIM applications 128, the chatbot application 120 can access the component 130 and read the calendar entries, including title, time, date, description, attachments, or any format, content, characteristic, or aspect thereof. Likewise, the chatbot application 120 can access the component 130 and read the received messages, such as sender, date, time, subject, body, carbon copy, action flag, attachments, or any format, content, characteristic, or aspect thereof. For example, the calendar entries can overlap with each other with respect to date and time and the received messages can be marked urgent and marked as received within a single day. At least one of the messages can include an email message. In some embodiments, the processor 116 includes a first core and a second core, where the first core reads the calendar entries concurrent to the second core reading the received messages without locking the PIM applications 128, whether such reading occurs with respect to one of the PIM applications 128 or several of the PIM applications 128. For each of the PIM applications 128, such configuration enables efficient processing if the PIM application 128 stores many received messages and many calendar entries. Similar processing may occur for other components of the PIM application 128, such as task entries. In some embodiments, for each of the PIM applications 128, the processor 116, which may be a single or multicore processor, runs a first thread and a second thread, where the first thread reads the calendar entries and the second thread reads the received messages. Similar processing may occur for other components of the PIM application 128, such as task entries.

In the block 416, the server 104 compares the content against the threshold and if the content satisfies the threshold, then the server 104 can take the action. The threshold can be hosted via the server 104 or be accessible to the server 104. For example, the threshold can be local to the server 104 or remote from the server 104. The threshold can correspond to the content in type, such as an alphanumeric value, a hexadecimal value, an image, a sound, a barcode, a document, a table, a diagram, a graphic, or others or be converted to correspond to the content in type.

In the block 418, the server 104 uses the content, as an input or a variable, to perform an analytic technique. In some embodiments, the analytics technique can include a correlation of a past application performance formed over time against a current application performance and then determining that a condition may or may not exist when the correlation satisfies or does not satisfy a threshold, which may be static or dynamic. In some embodiments, the analytic technique can include a workforce analysis workforce analytics in videoconferencing between a customer and a service provider such as a call center agent. This allows for determining an emotional status of the service provider by analyzing video images and/or audio associated therewith. More specifically, emotional status can be determined by identifying facial emotions and/or speech emotions. This technique allows for tracking changes in facial expressions and/or voice features over time. For example, facial emotions can be identified by locating feature reference points of the videoconference participant, aligning a virtual face mesh (also referred to as "mesh" for simplicity) based at least in part on the feature reference points, determining mesh changes that reflect and associated with face mimics, and comparing the mesh changes with reference facial parameters of a plurality of reference emotions stored in a database. Speech emotions can be identified by detecting voice features, and comparing the voice features to a plurality of reference voice features stored in a database. Once the emotional status is identified, it can be time-stamped, collected, stored, and analyzed to produce work quality metrics associated with the service provider. In some embodiments, the analytic technique can include wellness tracking and recommendations through wellness applications that integrate wearable devices with Human Resource (HR) and other enterprise application data and providing integrated wellness information can comprise retrieving enterprise application data from one or more data sources, retrieving data from one or more wearable devices of one or more employees, and applying analytics to the retrieved enterprise application data and the data retrieved from the wearable devices. The integrated wellness information can be generated based on the applied analytics and can be provided to the one or more employees through a user interface. In some embodiments, the analytic technique can include analyzing vocal and video recordings via determining that a meeting has initialized between a first user and a second user, where vocal and video recordings are produced for at least the first user; receiving the vocal and video recordings for the first user; analyzing the vocal and video recordings for the first user according to a parameter for speech and a parameter for gestures; determining an emotion and a role in the meeting for the first user based at least on the analyzed vocal and video recordings; and sending an output of analysis to at least one of the first user and the second user, where the output of analysis includes at least the determined emotion and the role in the meeting for the first user.

In the block 420, the server 104 sends, such as over the network 102, a message with the content to the client 108, such as an administrator client, responsive to the server 104 receiving a query from the client 108. For example, the client 108 may receive a user input requesting a status of a user associated with a user profile corresponding to the client 106. For example, the user input may include an alphanumeric string "How is John Smith doing today?" In response, the client 108 uploads the user input as the query over the network 102 to the server 104 to which the server 104 responsively outputs with the content, as aggregated, and the user stress level for the user associated with the user profile corresponding to the client 106. For example, the responsive output may include an alphanumeric string "Our team stress level is average, but John Smith is above average." Note that the responsive output may be visually distinct from other information presented on the client 108, such as via color, highlighting, hatching, fonts, font size, positioning, contrast, or others.

FIG. 5 shows a flowchart of an embodiment of a method for a chatbot application to monitor a user stress value on a client according to this disclosure. A method 500 includes a set of blocks 502-520, which enable the chatbot application 120 to interface with the PIM application 128 periodically in order to monitor the stress level. The method 500 is performed using the topology 100, as shown in FIG. 1.

In the block 502, the server 102 hosts the chatbot application 120.

In the block 504, the server 104, such as via the chatbot application 120, accesses the PIM application 128 hosted, which may include running, on the client 106. Since the server 104 hosts the chatbot application 120, then such access may occur in various ways, which may be periodic, such as every 30 minutes (or less or more inclusively), or an hourly or daily or weekly basis. For example, the server 104 may enable the chatbot application 120 to access the PIM application 128 via presenting, such as via serving, a user prompt at the client 106, such as via the PIM application 128, a network browser application running on a the OS 126, a messenger application running on the OS 126, or the OS 126. The user prompt can be a binary prompt, such as yes or no to enable the chatbot application 120 to access the PIM application 128. The binary prompt can be generated via ActiveX, Flash, HTML5 or other technologies. Likewise, for example, the server 104 may enable the chatbot application 120 to access the PIM application 128 via an administrator or supervisor user profile policy, such as set, supervised, or monitored via the client 108, with the administrator or supervisor policy policing the PIM application 128, with the administrator or supervisor policy being hosted on or accessible to the server 104. Similarly, for example, the server 104 may enable the chatbot application 120 to access the PIM application 128 via the PIM application 128 being configured to grant such access by default.

Note that the access for the chatbot application 120 can include at least one of read access, write access, delete access, or others. For example, the access can include the chatbot application 120 reading a plurality of calendar entries and a plurality of received messages in the PIM application 128. The calendar entries are stored within the component 130 and the received message are stored in the component 132. This reading can include reading of at least two calendar entries and at least two messages, including any format, content, characteristic, or aspect thereof. For example, the chatbot application 120 can access the component 130 and read the calendar entries, including title, time, date, description, attachments, or any format, content, characteristic, or aspect thereof. Likewise, the chatbot application 120 can access the component 130 and read the received messages, such as sender, date, time, subject, body, carbon copy, action flag, attachments, or any format, content, characteristic, or aspect thereof. For example, the calendar entries can overlap with each other with respect to date and time and the received messages can be marked urgent and marked as received within a single day. At least one of the messages can include an email message. In some embodiments, the processor 116 includes a first core and a second core, where the first core reads the calendar entries concurrent to the second core reading the received messages without locking the PIM application 128. Such configuration enables efficient processing if the PIM application 128 stores many received messages and many calendar entries. Similar processing may occur for other components of the PIM application 128, such as task entries. In some embodiments, the processor 116, which may be a single or multicore processor, runs a first thread and a second thread, where the first thread reads the calendar entries and the second thread reads the received messages. Similar processing may occur for other components of the PIM application 128, such as task entries.

Based on the chatbot application 120 reading the calendar entries and the received messages in the PIM application 128, the chatbot application 120 interprets the calendar entries and the messages, as read in the component 130 and the component 132. This interpretation can include an NPL technique, a machine learning technique, an optical character recognition technique, or any other AI technique. For example, the machine learning technique can include a decision tree learning technique, an association rule learning technique, an artificial neural network technique, a deep learning technique, an inductive logic programming technique, a support vector machine technique, a clustering technique, a Bayesian network technique, a reinforcement learning technique, a representation learning technique, a similarity and metric learning technique, a sparse dictionary learning technique, a genetic algorithm technique, a rule-based machine learning technique, a learning classifier system technique, or any others. As a result, the chatbot application 120 access the PIM application 128.

In the block 506, the server 104 generates a plurality of user stress level values periodically based on the chatbot application 120 accessing the PIM application 128 periodically. The periodic generation can be periodic of any frequency, such as every 30 minutes (or less or more inclusively), or an hourly or daily or weekly basis. The periodic accessing can be periodic of any frequency, such as every 30 minutes (or less or more inclusively), or an hourly or daily or weekly basis. The user stress level values are generated based on interpreting the calendar entries and the messages, as read in the component 130 and the component 132 of the PIM application 128. The user stress level values can be alphanumeric values. At least some of the user stress level values can be a whole number or a decimal, in any mathematical notation. The chatbot application 120 generates the user stress level values based on a set of algorithms internal to the chatbot application 128, although the value generation may be taking place in a deferred manner or in real-time, as the chatbot application 120 reads the PIM application 128, which may be continuing as long as the PIM application 128 is running. The user stress level values correspond to the user stress levels based on a set of predetermined criteria, which are updatable, internal to the chatbot application 120 and related to the messages marked as urgent and dated to within twelve hours of each other and the calendar entries overlapping with no free time slots in-between and are also dated to within the twelve hours with respect to the messages marked as urgent. For example, with respect to the calendar entries, as the calendar entries overlap with each other in one or more aspects, such as date/time or content, then the chatbot application 120 assigns more weight, such as by incrementing the value, to such overlap and thereby increases the value or vice versa. Likewise, with respect to the received messages, as the received messages overlap with each other in one or more aspects, such as date/time or content or flags, such as an urgency marking, then the chatbot application 120 assigns more weight, such as via incrementing the value, to such overlap and thereby increases the value or vice versa. As a result, the server 104 generates the user stress level values periodically based on the chatbot application 120 accessing the PIM application 128 periodically.

In the block 508, the server 104 forms a baseline value based on the values for the time period. Such formation may include determining an average value, a median value, a mode value, a sum value, a standard deviation, or others as known to skilled artisans.

In the block 510, the server 104 takes an action based on the baseline value. The action can be with respect to any member of the topology 100 as shown in FIG. 1. The action can be taken upon the forming of the baseline value or upon comparing the baseline value against a threshold, whether local to or remote from the server 104. For example, the server 104 can compare the baseline value against the threshold and if the baseline value satisfies the threshold, then the server 104 can take the action. The action can be of any type, such as reading/writing/deleting a datum or a data structure or sending a message or requesting that an output device output an output, such as any member of the topology 100 in FIG. 1, such as via the server 104 sending a message to the client 108, such as when the client 108 is an administrator of the server 104. For example, the action can include a request to print out a message without prompting the client 106 or the client 108, such as a barcode, via the printer 112 or a request to a voice/image/chat communication session with the mobile device 114, as preset in advance, or any others. For example, the action can include the server 104 broadcasting a message to a client, such as the client 106 or the client 108, with the message including the baseline value or being informative of the baseline value. For example, the action can include the server 104 reading a set of criteria or rules hosted on or accessible to the server 104, applying the set of criteria or rules to the baseline value, and then inserting that baseline value into a message sent to the client 106 or the client 108. For example, the action can include the server 104 tracking the baseline value over a time period, such as an hour, a day, a week, a month, a year, including any periods in-between, whether lesser or greater. The server 104 may determine how the baseline value changes over the time period and output a baseline value report over the network 102 on the client 106 or the client 108 based on such determining responsive to a query from the client 106 or the client 108. Similarly, the server 104 may generate a baseline value based on such determining and may output over the network 102 the baseline value to the client 106 or the client 108 responsive to a query from the client 106. Likewise, the server 104 may track the baseline value of the time period, determine how the baseline value changes over the time period, and output a baseline value report based on the determining responsive to a query from the client 106 or the client 108. For example, the server 104 may aggregated the baseline value with other baseline values and then act based on such aggregation, as disclosed herein.

In the block 512, the server 104 receives, such as over the network 102, a permission, such as an alphanumeric value, from the client 106. For example, the permission can be associated with a user profile for the PIM application 128 and may be responsive to the user prompts, such as presented via the client 106. The server 104 may enable the chatbot application 120 to access the PIM application 128 associated with the user profile via presenting, such as via serving, the user prompts at the client 106, as disclosed herein, where the user prompt can be a binary prompt, such as yes or no to enable the chatbot application 120 to access the PIM application 128. The binary prompt can be generated via ActiveX, Flash, HTML5 or other technologies. The permission contains responses to the binary prompt, such as a binary input, such as yes or no.

In the block 514, the server 104 reads the received messages or the calendar entries in parallel or via threads. The access for the chatbot application 120 can include at least one of read access, write access, delete access, or others. For example, the access can include the chatbot application 120 reading a plurality of calendar entries and a plurality of received messages in the PIM application 128. The calendar entries are stored within the component 130 and the received message are stored in the component 132. This reading can include reading of at least two calendar entries and at least two messages, including any format, content, characteristic, or aspect thereof. For example, the chatbot application 120 can access the component 130 and read the calendar entries, including title, time, date, description, attachments, or any format, content, characteristic, or aspect thereof. Likewise, the chatbot application 120 can access the component 130 and read the received messages, such as sender, date, time, subject, body, carbon copy, action flag, attachments, or any format, content, characteristic, or aspect thereof. For example, the calendar entries can overlap with each other with respect to date and time and the received messages can be marked urgent and marked as received within a single day. At least one of the messages can include an email message. In some embodiments, the processor 116 includes a first core and a second core, where the first core reads the calendar entries concurrent to the second core reading the received messages without locking the PIM applications 128. Such configuration enables efficient processing if the PIM application 128 stores many received messages and many calendar entries. Similar processing may occur for other components of the PIM application 128, such as task entries. In some embodiments, the processor 116, which may be a single or multicore processor, runs a first thread and a second thread, where the first thread reads the calendar entries and the second thread reads the received messages. Similar processing may occur for other components of the PIM application 128, such as task entries.

In the block 516, the server 104 compares the baseline value against the threshold and if the baseline value satisfies the threshold, then the server 104 can take the action. The threshold can be hosted via the server 104 or be accessible to the server 104. For example, the threshold can be local to the server 104 or remote from the server 104. The threshold can correspond to the baseline value in type, such as an alphanumeric value, a hexadecimal value, an image, a sound, a barcode, a document, a table, a diagram, a graphic, or others or be converted to correspond to the content in type.

In the block 518, the server 104 uses the baseline value, as an input or a variable, to perform an analytic technique. In some embodiments, the analytics technique can include a correlation of a past application performance formed over time against a current application performance and then determining that a condition may or may not exist when the correlation satisfies or does not satisfy a threshold, which may be static or dynamic. In some embodiments, the analytic technique can include a workforce analysis workforce analytics in videoconferencing between a customer and a service provider such as a call center agent. This allows for determining an emotional status of the service provider by analyzing video images and/or audio associated therewith. More specifically, emotional status can be determined by identifying facial emotions and/or speech emotions. This technique allows for tracking changes in facial expressions and/or voice features over time. For example, facial emotions can be identified by locating feature reference points of the videoconference participant, aligning a virtual face mesh (also referred to as "mesh" for simplicity) based at least in part on the feature reference points, determining mesh changes that reflect and associated with face mimics, and comparing the mesh changes with reference facial parameters of a plurality of reference emotions stored in a database. Speech emotions can be identified by detecting voice features, and comparing the voice features to a plurality of reference voice features stored in a database. Once the emotional status is identified, it can be time-stamped, collected, stored, and analyzed to produce work quality metrics associated with the service provider. In some embodiments, the analytic technique can include wellness tracking and recommendations through wellness applications that integrate wearable devices with HR and other enterprise application data and providing integrated wellness information can comprise retrieving enterprise application data from one or more data sources, retrieving data from one or more wearable devices of one or more employees, and applying analytics to the retrieved enterprise application data and the data retrieved from the wearable devices. The integrated wellness information can be generated based on the applied analytics and can be provided to the one or more employees through a user interface. In some embodiments, the analytic technique can include analyzing vocal and video recordings via determining that a meeting has initialized between a first user and a second user, where vocal and video recordings are produced for at least the first user; receiving the vocal and video recordings for the first user; analyzing the vocal and video recordings for the first user according to a parameter for speech and a parameter for gestures; determining an emotion and a role in the meeting for the first user based at least on the analyzed vocal and video recordings; and sending an output of analysis to at least one of the first user and the second user, where the output of analysis includes at least the determined emotion and the role in the meeting for the first user.

In the block 520, the server 104 sends, such as over the network 102, a message with the baseline value to the client 108, such as an administrator client, responsive to the server 104 receiving a query from the client 108. For example, the client 108 may receive a user input requesting a status of a user associated with a user profile corresponding to the client 106. For example, the user input may include an alphanumeric string "How is John doing today?" In response, the client 108 uploads the user input as the query over the network 102 to the server 104 to which the server 104 responsively outputs with the baseline value for the user associated with the user profile corresponding to the client 106. For example, the responsive output may include an alphanumeric string "Our team stress level baseline is average, but John is below average." Note that the responsive output may be visually distinct from other information presented on the client 108, such as via color, highlighting, hatching, fonts, font size, positioning, contrast, or others.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain embodiments may be combined and sub-combined in and/or with various other embodiments. Also, different aspects and/or elements of embodiments, as disclosed herein, may be combined and sub-combined in a similar manner as well. Further, some embodiments, whether individually and/or collectively, may be components of a larger system, wherein other procedures may take precedence over and/or otherwise modify their application. Additionally, a number of steps may be required before, after, and/or concurrently with embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the terms "below" and "lower" can encompass both an orientation of above and below.

The terminology used herein is for describing particular embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method comprising:
   accessing, by a server, a database storing a first user profile and a second user profile, wherein the first user profile has a first level of access with respect to the server, wherein the second user profile has a second level of access with respect to the server, wherein the first level of access is higher than the second level of access;
   generating, by the server, a user interface based on the first user profile;
   presenting, by the server, the user interface on a first client, wherein the user interface includes a set of input elements, wherein the first client is associated with the first user profile;
   receiving, by the server, a set of inputs from the first client, wherein the set of inputs is sourced from the set of input elements;
   generating, by the server, a macro based on the set of inputs;
   storing, by the server, the macro in the second user profile such that the macro is associated with a range of values based on the set of inputs, wherein the second user profile includes the range of values;

causing, by the server, a chatbot application to read a calendar entry of a personal information manager (PIM) application and a received message of the PIM application, wherein the PIM application is based on the second user profile, wherein the PIM application is associated with a second client, wherein the second client is associated with the second user profile;

executing, by the server, a natural language processing protocol to identify an urgency value of the received message;

generating, by the server, a busyness factor based on the chatbot application having read the calendar entry and the received message, wherein the busyness factor is generated based on a first weight associated with the calendar entry and a second weight corresponding to the urgency value of the received message;

comparing, by the server, the busyness factor against the range of values; and causing, by the server, the macro to be performed based on the busyness factor being within the range of values such that the macro runs on the PIM application.

2. The method of claim 1, wherein the PIM application includes a plurality of calendar entries including the calendar entry, wherein the macro is programmed to act on the calendar entries.

3. The method of claim 1, wherein the PIM application includes a plurality of received messages including the received message, wherein the macro is programmed to act on the received messages.

4. The method of claim 1, wherein the PIM application includes a plurality of calendar entries including the calendar entry, wherein the PIM application includes a plurality of received messages including the received message, wherein the macro is programmed to act on the calendar entries and on the received messages.

5. The method of claim 1, further comprising:
receiving, by the server, a permission from the second client before the chatbot application reads the calendar entry and the received message, wherein the chatbot application reads the calendar entry and the received message responsive the permission.

6. The method of claim 1, wherein the macro is programmed to initiate a communication session with a mobile phone other than the second client, wherein the communication session includes at least one of a voice session, an image session, or a chat session, wherein the communication session is based on at least one of a phone number or a screenname stored in the second user profile.

7. The method of claim 1, further comprising:
receiving, by the server, an input from the second client before the macro is generated; and
storing, by the server, the input in the second user profile before the macro is generated, wherein the macro is generated based on the input in the second user profile.

8. The method of claim 7, wherein the input modifies a default setting in the second user profile.

9. The method of claim 1, wherein the macro is programmed to be performed via the server.

10. The method of claim 1, wherein the macro is programmed to be performed via the second client.

11. The method of claim 1, wherein the macro is generated based on the PIM application including a plurality of calendar entries that overlap with each other with respect to date and time and a plurality of received messages that are marked urgent, wherein the calendar entries include the calendar entry, wherein the received messages include the received message.

12. The method of claim 11, wherein the received messages are marked as received within a single day.

13. The method of claim 12, wherein at least one of the received messages includes an email message.

14. The method of claim 1, wherein the PIM application includes a task portion with a plurality of task entries, wherein the macro is generated based on the chatbot application reading the task entries.

15. The method of claim 1, wherein the second client is in communication with a printer, wherein the macro is programmed to instruct the printer to print a content without a user prompt output via the second client.

16. The method of claim 15, wherein the content includes a barcode.

17. The method of claim 1, wherein the server includes a first processing core and a second processing core, wherein the first processing core reads a plurality of calendar entries in the PIM application concurrent to the second processing core reading a plurality of received messages in the PIM application without locking the PIM application, wherein the calendar entries include the calendar entry, wherein the received messages include the received message.

18. The method of claim 1, wherein the server runs a first thread and a second thread, wherein the first thread reads a plurality of calendar entries in the PIM application, wherein the second thread reads a plurality of received messages in the PIM application, wherein the calendar entries include the calendar entry, wherein the received messages include the received message.

19. The method of claim 1, wherein the macro is programmed to be performed via the first client.

20. A system comprising:
a server configured to:
access a database storing a first user profile and a second user profile, wherein the first user profile has a first level of access with respect to the server, wherein the second user profile has a second level of access with respect to the server, wherein the first level of access is higher than the second level of access;
generate a user interface based on the first user profile;
present the user interface on a first client, wherein the user interface includes a set of input elements, wherein the first client is associated with the first user profile;
receive a set of inputs from the first client, wherein the set of inputs is sourced from the set of input elements;
generate a macro based on the set of inputs;
store the macro in the second user profile such that the macro is associated with a range of values based on the set of inputs, wherein the second user profile includes the range of values;
run a chatbot application;
cause the chatbot application to read a calendar entry of a personal information manager (PIM) application and a received message of the PIM application, wherein the PIM application is based on the second user profile, wherein the PIM application is associated with a second client, wherein the second client is associated with the second user profile;
execute a natural language processing protocol to identify an urgency value of the received message;

generate a busyness factor based on the chatbot application having read the calendar entry and the received message, wherein the busyness factor is generated based on a first weight associated with the calendar entry and a second weight corresponding to the urgency value of the received message;

compare the busyness factor against the range of values; and cause the macro to be performed based on the busyness factor being within the range of values such that the macro runs on the PIM application.

* * * * *